US007685973B2

(12) United States Patent
Nelson et al.

(10) Patent No.: US 7,685,973 B2
(45) Date of Patent: Mar. 30, 2010

(54) WATER ENGINE AND METHOD

(75) Inventors: Anju Nelson, 5897 Lakeville Rd., Orlando, Orange County, FL (US) 32818; Daniel E. Nelson, Orlando, FL (US)

(73) Assignee: Anju Nelson, Orlando, FL (US)

( * ) Notice: Subject to any disclaimer, the term of this patent is extended or adjusted under 35 U.S.C. 154(b) by 1115 days.

(21) Appl. No.: 11/328,774

(22) Filed: Jan. 11, 2006

(65) Prior Publication Data

US 2006/0115414 A1 Jun. 1, 2006

Related U.S. Application Data

(63) Continuation-in-part of application No. 11/034,639, filed on Jan. 13, 2005, now abandoned.

(60) Provisional application No. 60/539,003, filed on Jan. 26, 2004.

(51) Int. Cl.
*F02B 47/02* (2006.01)
(52) U.S. Cl. .................. 123/25 D; 123/25 P; 60/39.53; 60/645; 60/670

(58) Field of Classification Search ............ 60/645, 60/670, 39.05, 39.53, 39.54, 39.3; 123/25 D, 123/25 P
See application file for complete search history.

(56) References Cited

U.S. PATENT DOCUMENTS

| 4,476,817 A * | 10/1984 | Lindberg ................. 123/3 |
| 4,552,106 A * | 11/1985 | Spence .................. 123/198 A |
| 5,803,022 A * | 9/1998 | Nelson et al. ............. 123/25 D |
| 6,849,247 B1 * | 2/2005 | Wagaman et al. ........... 423/657 |

* cited by examiner

*Primary Examiner*—Hoang M Nguyen

(57) ABSTRACT

A method and apparatus to heat-activate hydrogen of water for powering rotational, reaction-thrust and projectile-expulsion embodiments (19, 60, 61, 75) of a water engine (10) with hydrogen energy of water which is spray-atomized and electrically heated internally in one or more hydrogen activators (1). Water-hydrogen electrons of the spray-atomized water are heat-activated up to exponentially greater output heat-activation energy than input activation-heat energy added electrically with power generated from forms of the water engine. A minor portion of the output heat-activation energy of the water hydrogen is utilized for generating electrical current for the input activation heat of the spray-atomized water in the hydrogen activators. Net output heat-activation pressure of water-hydrogen is directed from one or more of the hydrogen activators to one or more use chambers (9) of universal-use forms of the water engine. Rotational features of the water engine preferably employ a turbocam drive (20).

21 Claims, 17 Drawing Sheets

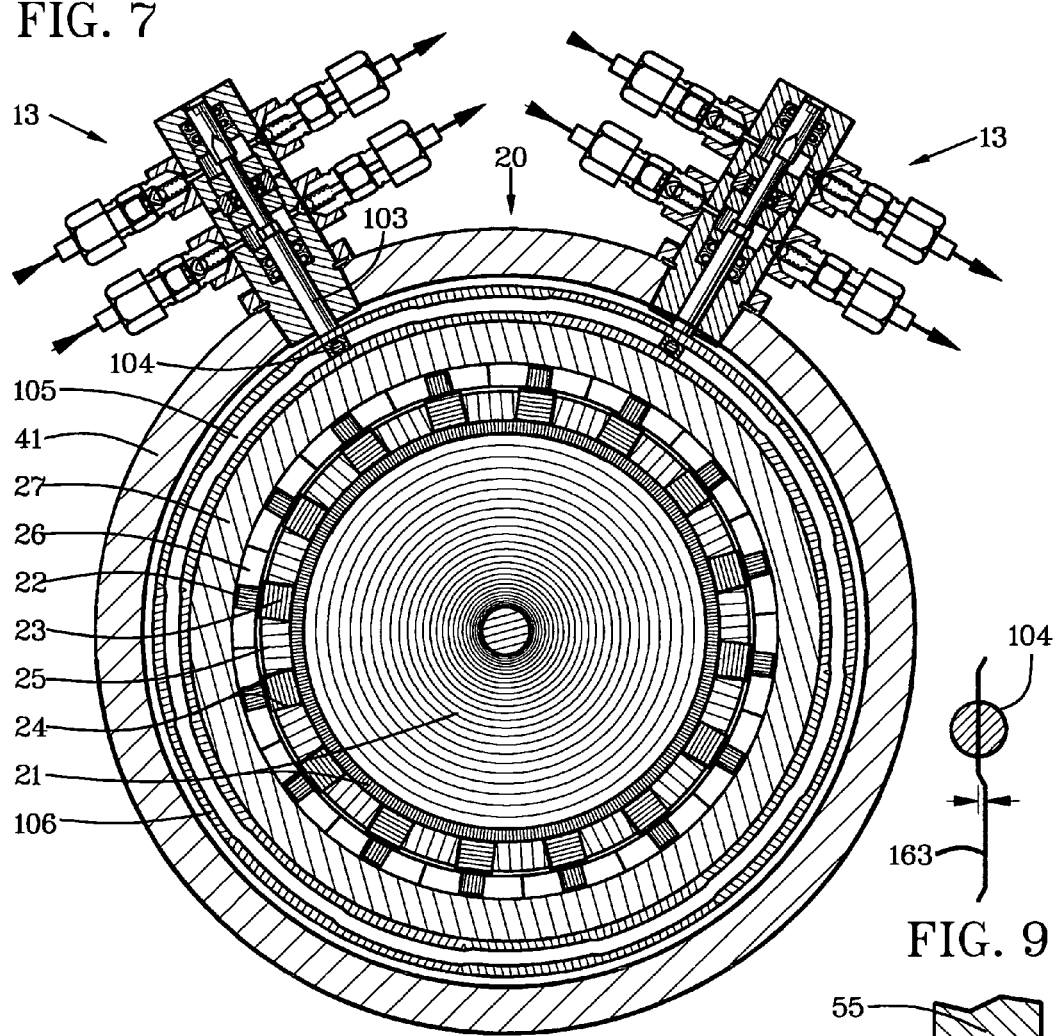
FIG. 7
FIG. 9
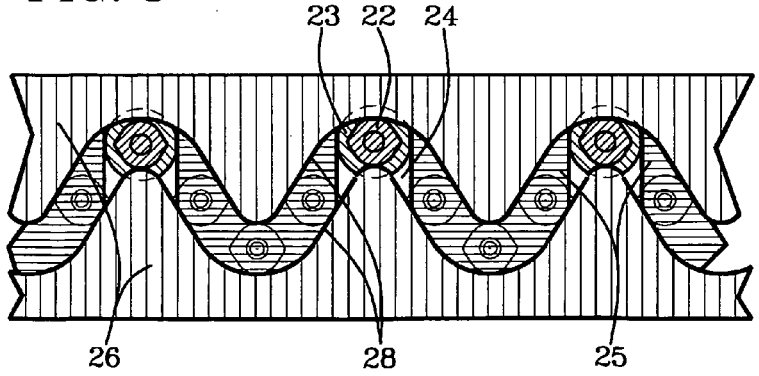
FIG. 8
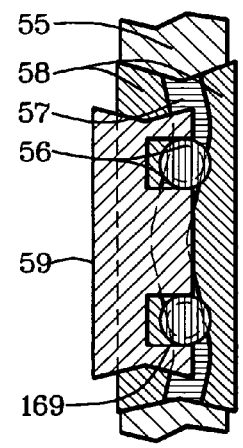
FIG. 10

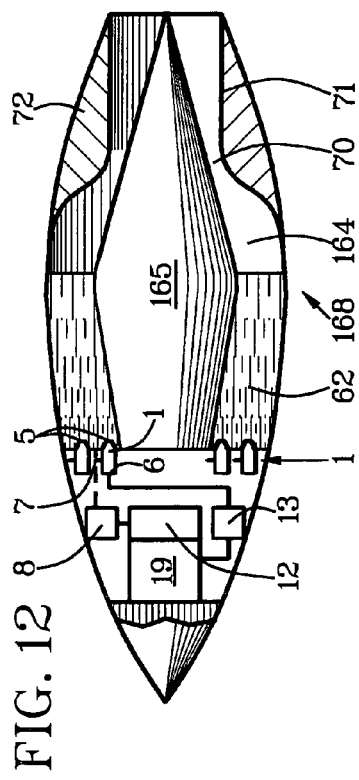
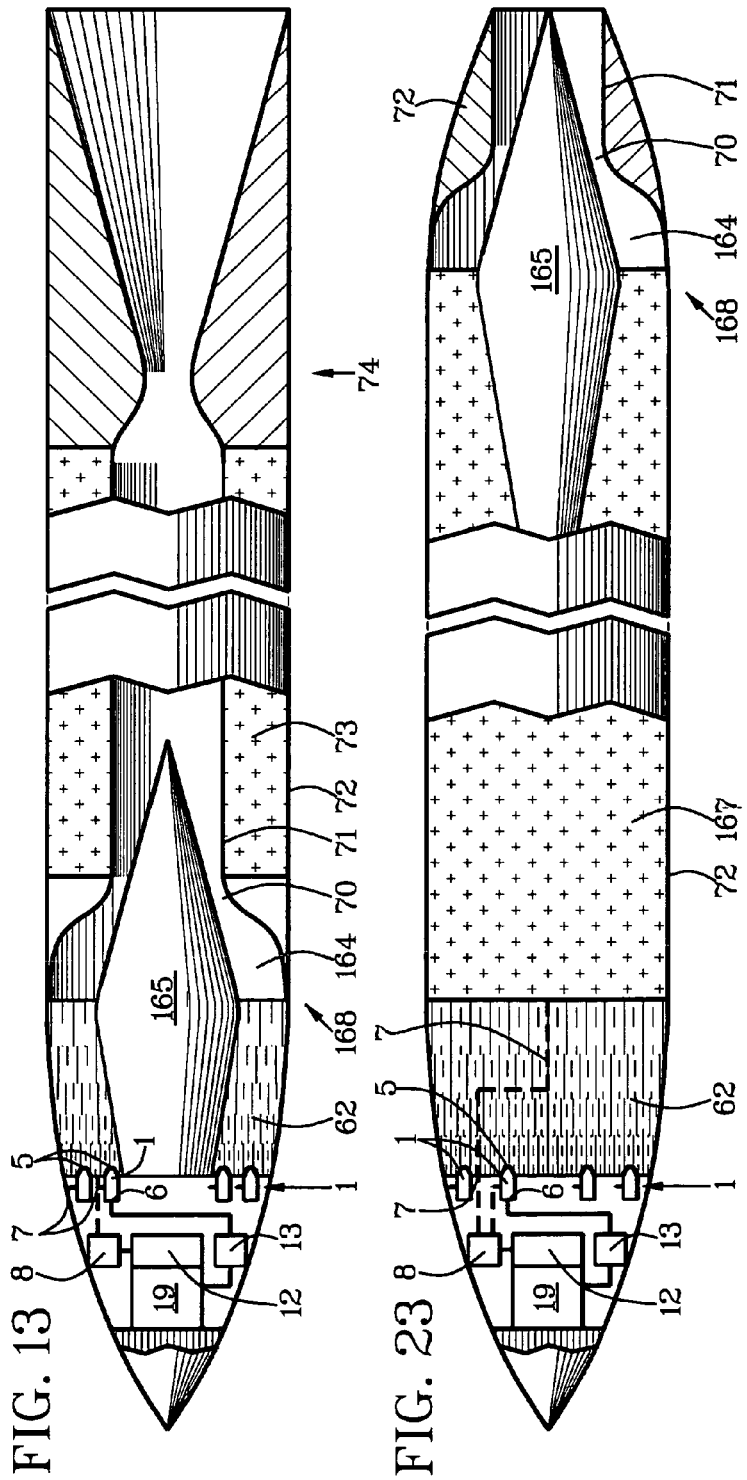
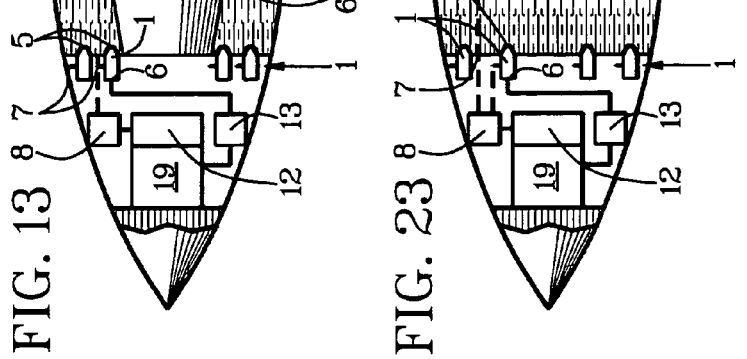

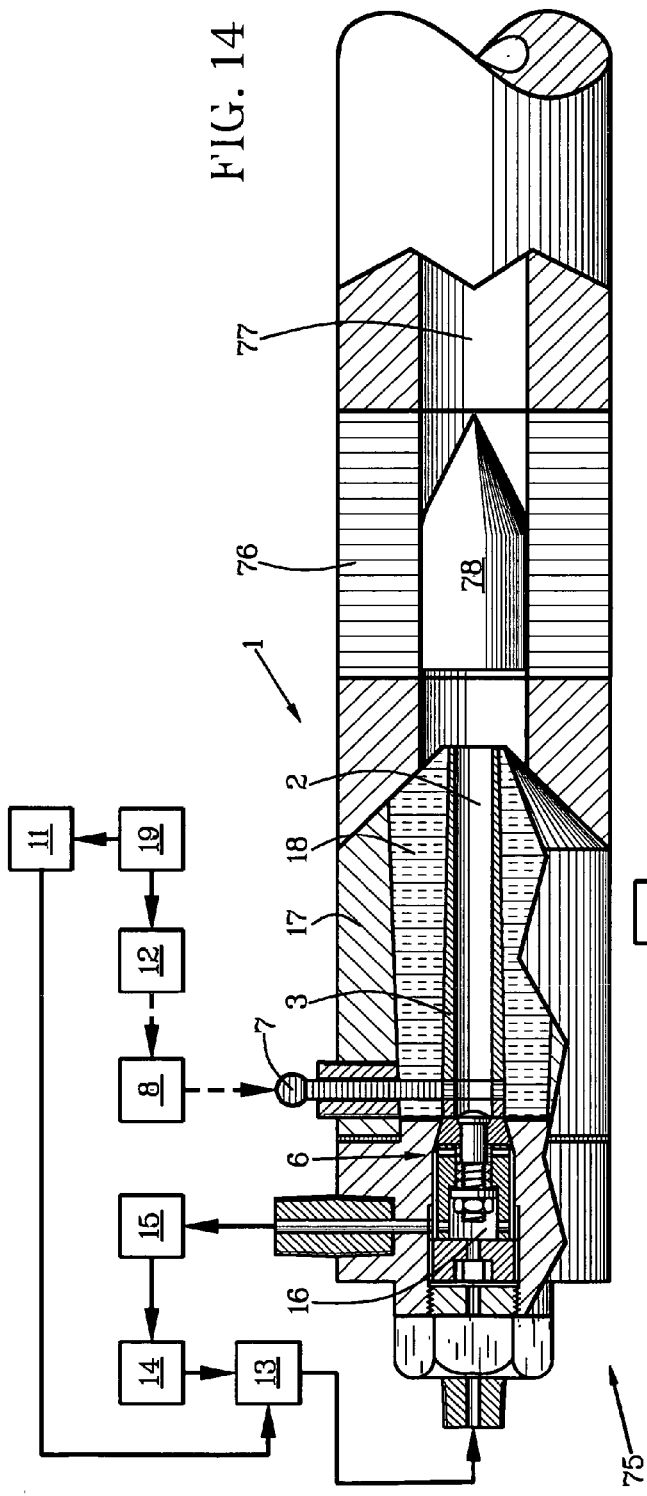
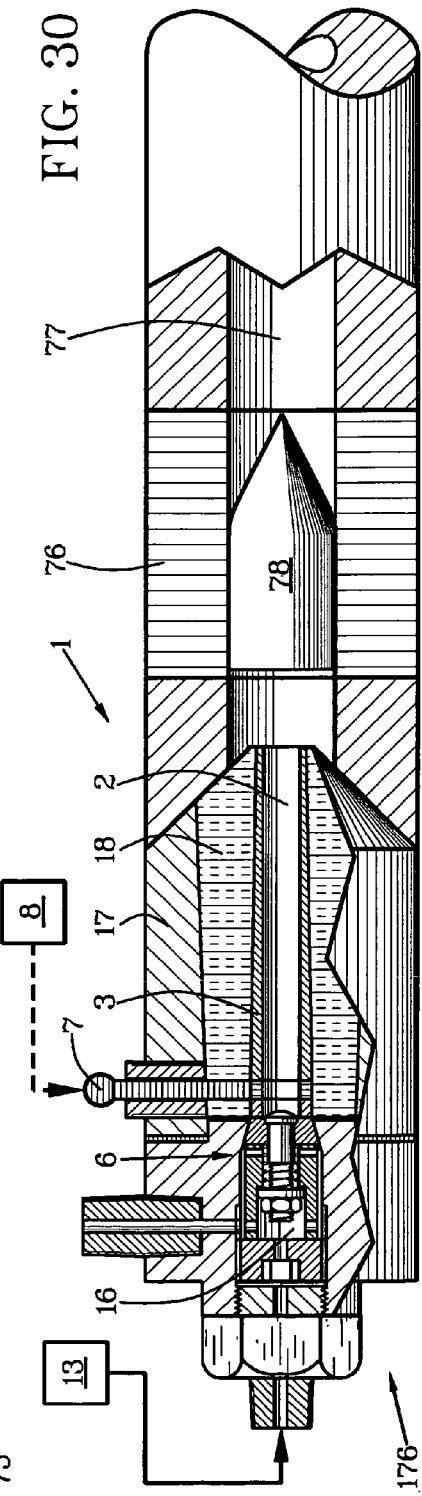

FIG. 16
FIG. 17
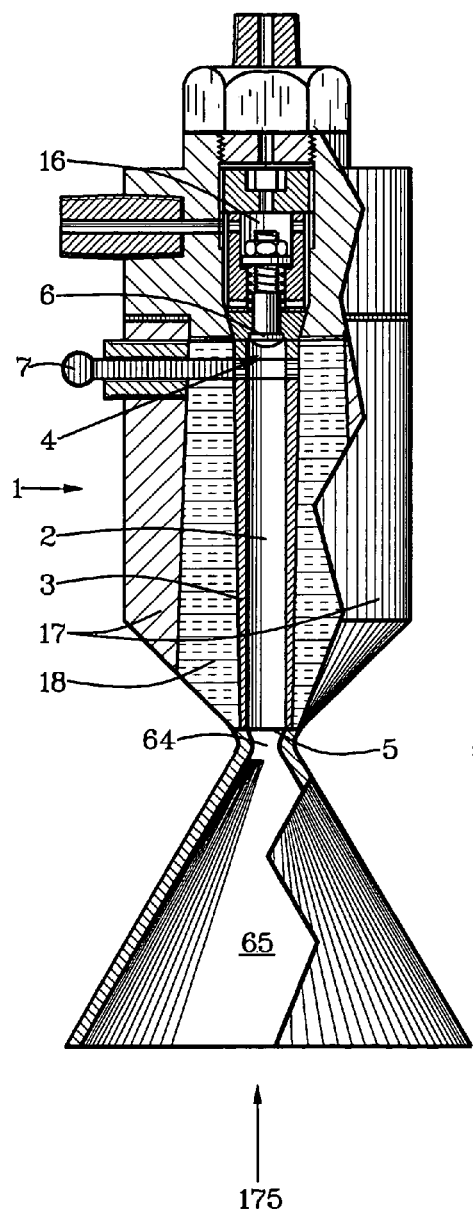
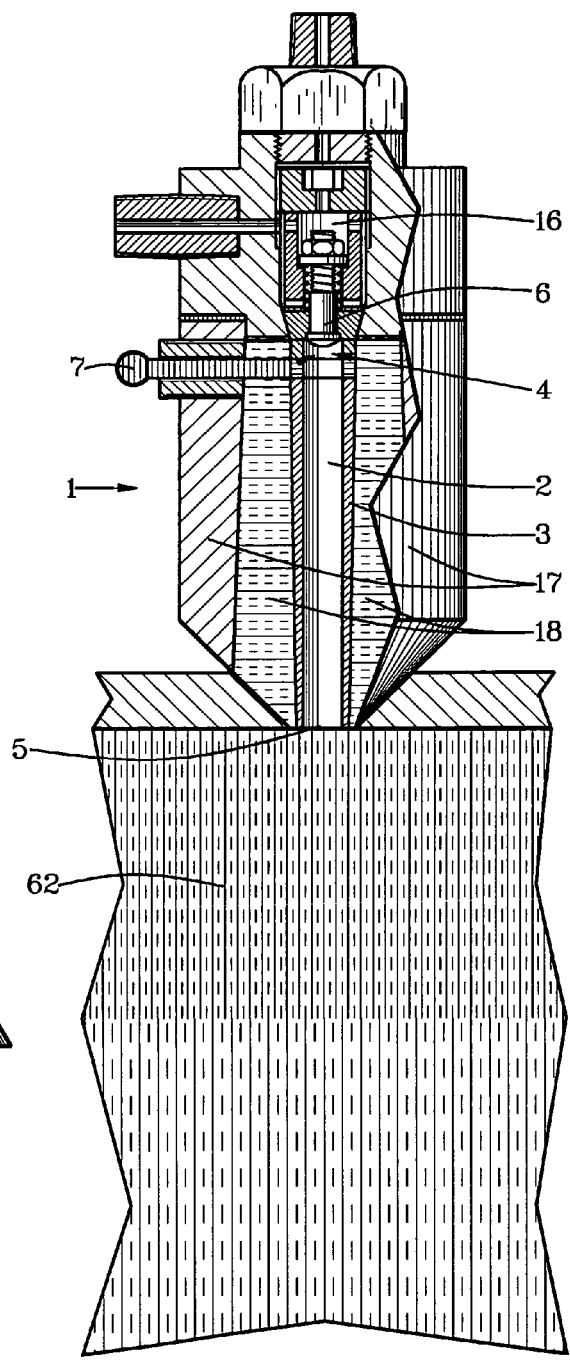

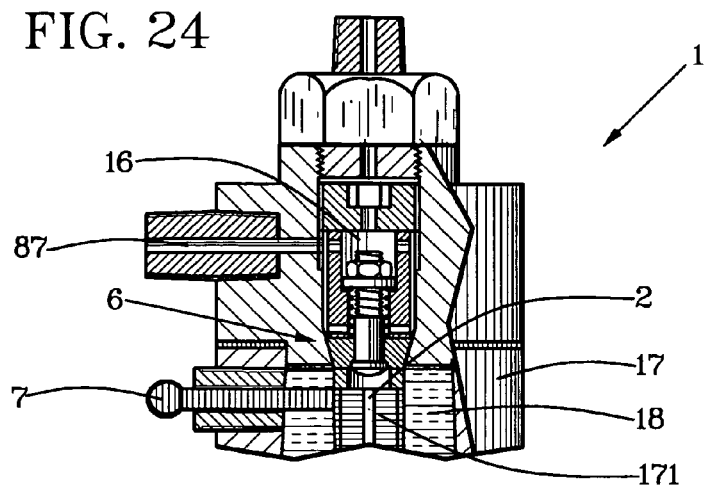
FIG. 24
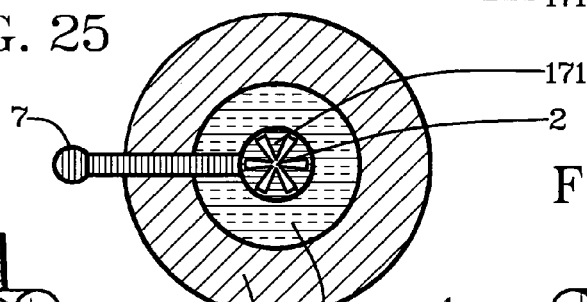
FIG. 25
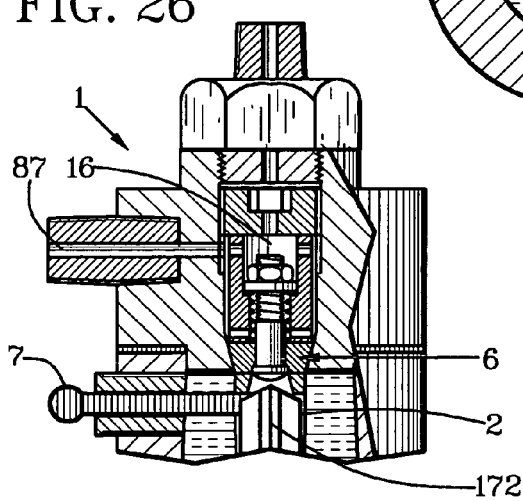
FIG. 26
FIG. 27
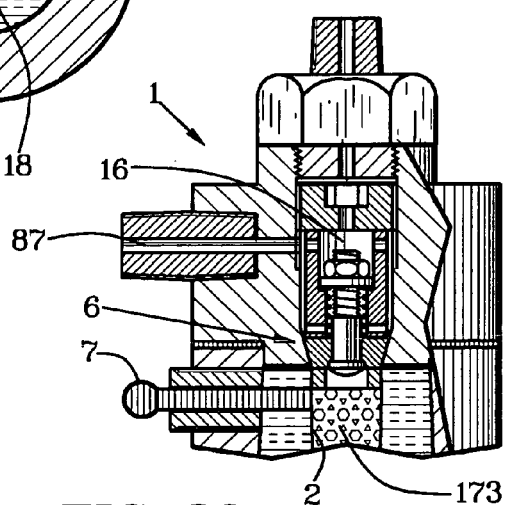
FIG. 28
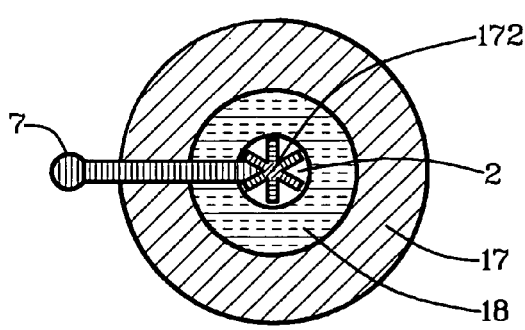
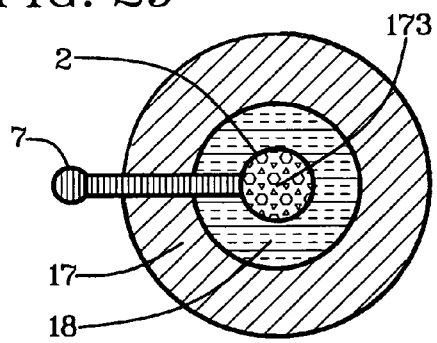
FIG. 29

WATER ENGINE AND METHOD

This is a continuation in part of U.S. patent application Ser. No. 11/034,639 filed on Jan. 13, 2005, now abandoned, which is a continuation in part of U.S. Provisional Patent Application No. 60/539,003 filed on Jan. 26, 2004 by the same inventive entity.

BACKGROUND OF THE INVENTION

1. Field of the Invention

This invention relates to a water engine and method for providing water-hydrogen energy by electrically superheating atomized water in a hydrogen activator with electrical current generated from a portion of greater output of hydrogen-electron energy than input heating energy from output power of adaptations of the water engine for all atmospheric and space uses selectively.

2. Relation to Prior Art

There are no known engines which employ heat-activated hydrogen pressure of atomized water for output power in a manner taught by this invention. This is a pioneer invention that teaches use of water as a hydrogen-host fuel in a water engine for basic forms of power. Included are rotation, reaction-thrust, projectile-expulsion, tool and combined-engine power in and out of the atmosphere.

Due to pioneering nature of this water engine, it is within the public-benefit intent of the patent laws of the Nations Of The World to disclose and to teach it comprehensively with all of its enabling features and components being described and illustrated in a single patent.

There is related but different prior art in heat-engine use of water. Included has been water augmentation of reaction thrust for high mass, low pressure and low velocity of exhaust gases of jet engines for takeoff from aircraft carriers and other short military runways. This prior heat-engine use of water is completely opposite from low mass, high pressure and high velocity of heat-activated water hydrogen and oxygen for trans-space thrust with this invention. Bypass-airflow augmentation more efficiently with the Water Engine is provided for short-runway takeoff and atmospheric thrust.

There have been attempts to use water for achieving output-work pressure with IC engines. Results have been impractical-to-negative. Superheat of water for exponential pressure per heat level after atomization in the water engine is not achievable in IC engines. Atomic Physics of water that douses combustion and supports biological life in natural conditions are not utilized appropriately by IC engines nor by steam engines with bulk-water boilers for making water a hydrogen-host fuel.

Prior art of the instant inventive entity, Anju and Daniel Nelson, added steam at a combustion-supportive heat level to regenerative combustion for achieving superheated-steam pressure in addition to increasing allowable combustion-heat pressure with steam cooling. Previous Previous Nelson Engines eliminated the typically 30 percent waste-heat-cooling loss of conventional IC engines. They also decreased exhaust-heat loss of conventional engines through conversion of low pressure per heat of combustion to high pressure of steam with heat transferred from combustion to steam. For substantially higher fuel efficiency, they employed a combustion-and-steam thermodynamic cycle with combustion and steam power as described in U.S. Pat. Nos. 3,308,626 for a Turbine/ram/rocket Engine, 5,222,361 for a Rocketjet Engine and 5,803,022 for a Combustion and Steam Engine. These previous Nelson Engines, however, are not water engines that produce power from water only.

Instead of celestial hydrogen energy of this invention, known engine systems employ combustion of terrestrial hydrocarbon fuel or dissociated hydrogen and other terrestrial energy.

SUMMARY OF THE INVENTION

A fundamental object of this invention is to make water the world's eco-positive new fuel. Resultantly numerous and far-reaching world-improvement objects are included. Related scientific discovery and technical innovation involved are explained as deemed appropriate for introducing novelty of aspects of this art.

With the water engine, exponentially more hydrogen output energy than input energy is generated by resistance-superheating atomized water internally in hydrogen activators. Within mechanism of the water engine, water hydrogen is more explosively powerful than any known combustible fuel. Abundant water that hosts the hydrogen fuel of suns can now end pollution, improve the atmosphere, reverse global warming, provide all forms of atmospheric and space power, irrigate the world and make fresh water for continuing and expanding human civilization universally.

The same Atomic Physics of water that supports life is utilized to provide engine power. Oxygen's low-mass nuclear attraction of hydrogen and hydrogen's proton-only attraction of hydrogen electrons enable life and water-engine power also.

Astrophysically, the energy and life support of suns in the universe also are enabled by hydrogen's proton-only attraction of electrons. The water engine utilizes a particularly tenuous molecular attraction of hydrogen by oxygen in the form of life-supportive water to provide astrophysical hydrogen energy. Each water engine heat-cycles hydrogen energy relatively similar to a sun.

Low nuclear mass and resulting low nuclear attraction of electrons by hydrogen's proton-only nuclei allow its electrons to be heat-activated exponentially per heat added. This is a transitional-element phenomena of Astrophysics that allows hydrogen of suns to emit energy exponentially by heat-activation from astronomical mass-attraction. This same transitional-element phenomena also allows hydrogen of water to emit energy exponentially per electrical heat added regeneratively for heat-activation with output power of the water engine.

All other elements and their molecular combinations have relatively higher nuclear mass and resultantly higher nuclear attraction of electrons to an extent that requires greater input than output for heat-activation of their molecularly associated electrons. Greater input than output from heat-activating other elements and molecules is described by the well-known Carnot Principle of Energy Conservation. The Carnot Principle, however, was introduced prior to and, therefore, without accounting for either: (1) exponential energy per heat level from heat-activation of water-hydrogen electrons for effects of the standard steam table, (2) hydrogen atomic energy or (3) current knowledge of the astrophysics of hydrogen.

The water engine utilizes astrophysical hydrogen energy of water for engine power to support civilization. It makes water not only the most powerful and the most abundant, but also an eco-positive engine fuel for universal use. Eco-positively, hydrogen energy of the water engine is fractionally analogous to hydrogen energy from the sun.

Life forms utilize widely differing functions of the Atomic Physics of hydrogen and oxygen of water than utilized for energy by suns and the water engine, but the physical characteristics utilized are the same. Ease of phase change and reliability of molecular association and dissociation with other elements biologically for life forms are enabled by the same transitional-element phenomena of hydrogen as utilized for energy of suns and the water engine. This same phenomena of hydrogen is utilized in molecular association with oxygen for life-support functions and related physical forms and characteristics of water.

Long-range existence and progress of civilization in the universe may be as dependent on use of water with the water engine as biological life is dependent on water naturally. Engine use of water as a hydrogen-host fuel may be one of the greatest advancements in human history.

Water-engine embodiments and features can enable a new level of abundance for Humans on Earth and beyond. A 1,000 horsepower water engine small enough for a mini car or large motorcycle can get 50 mpg of plain water in a super car. With the weight of a family-car engine, it can run a train on less water than diesel fuel per engine power. Instead of emitting carbon dioxide and greasy noxious exhaust fumes, it increases atmospheric moisture and oxygen that support life, eliminate smog and can reverse global warming. Electrical generation can be 5% of hydroelectric costs and non-polluting anywhere. Enduringly harmful nuclear energy, nuclear ships and radioactive weapons are no longer necessary. Propulsion embodiments can provide VTOL space and air travel at low cost. Conventional blastoff rocket systems can be replaced safely at less than one-tenth-of-one-percent of present rocket costs per payload. A "space train" with selectively faster-than-light speed is made possible. Projectile-expulsion applications can provide global-to-short-range projectile delivery with speed, rate and cost-effectiveness for more publicly affordable national defense. Major eco-positive enhancements of industry, power, travel, agriculture, mining, construction, refrigeration, air-conditioning, tools and other elements of civilization are enabled. Heretofore unthinkable global and space achievements are made possible by the water engine and method.

Sea water or fresh water can now obsolete petroleum, nuclear, hydroelectric, coal, wind, fuel-cell, bio-fuel, biomass, solar, oxidative hydrogen and other known energy and engine systems. The water can be filtered, distilled and optionally recycled by a proprietary engine subsystem.

Shaped cylindrically like a short turbine engine or drum, a basic power unit of the water engine has a Nelson Turbocam Drive and one double-action power piston. With typically 32 high-power and high-leverage hydrogen strokes per revolution, 98% power-conversion efficiency, ultrahigh volumetric efficiency and no heated side-pressure friction, it is over ten times more powerful per weight and can last five times longer than gasoline or diesel engines and considerably longer than conventional jet engines.

Volume-production cost per use-life power of water engines can be twenty percent of gasoline or diesel engines and less than one percent of conventional jet or rocket engines.

Known but not utilized previously, electrons of hydrogen atoms of $H_2O$ water can be heat-activated exponentially per rate of heat added. This makes water a hydrogen-host fuel that can be self-energized within system-net limits of astrophysical energy conservation. Although it does not burn or oxidize, water is more pressure-generative per rate of input energy than any other known substance. Tending to obscure and to discourage recognition of water as a self-energizable fuel with suitable mechanization previously are its support of biological life and its liquid state that douses flame.

The water engine self-energizes water as a hydrogen-host fuel by utilizing a minor portion of the water-engine's exponential hydrogen power output per input energy to generate electrical current for heat-activating electrons of proton-nuclei hydrogen that is heat-distanced from low-attraction nuclei of oxygen that has been heat-weakened.

In the water engine, spray-atomized water is heated electrically to 700°-to-2,200° F. This causes 3,000-to-30,000 psi of near totally hydrogen pressure that can be over eight times higher than typical combustion pressure of car engines or jet engines and over four times higher than present state-of-the-art rocket engines. Demonstrative of achievable high pressure of hydrogen is pressure of over 40,000 psi at a heat level less than 2,600° F. for single-use stored energy for "barrel engines" of some military torpedoes. Although only 11.76% hydrogen by weight, steam is increasingly over 98% hydrogen-electron-activation pressure per heat added.

Optionally for fuel-heat augmentation, combustion heat can be added to further heat the atomized water for increased hydrogen power output of a fuel-augmentation embodiment of the water engine in atmospheric use conditions.

Previously, use of enormous but generally unacknowledged hydrogen pressure of steam was limited to a fraction of an Engineering steam-table maximum of 3,208 psi at 705° F. to avoid over-stressing boiler-component walls. There was no known way to achieve, to use nor to multiply increase of output per input of hydrogen energy of water. In conventional steam engineering data, unusably high hydrogen pressure of superheated steam was regarded as "critical" for being avoided.

Energy required per heat level to heat-activate hydrogen varies within a range of 5%-to-25% of total power for use conditions of forms of the water engine. This results from hydrogen-pressure increase of steam per heat added above 300° F. In the water engine, effectively exponential increase of hydrogen pressure per heat level starts at 700° F. As recorded in standard steam tables which are printed in most handbooks of Physics and/or Chemistry, but without indicating the hydrogen source, pressure increase per degree of heat added is 1 psi at 300° F., 6.2 psi at 500° F. and 70 psi at 700° F. Projectively above previous engineering limitations at 705° F., hydrogen pressure increase is approximately 1,000 psi per degree of heat added at 1,500° F. This is exponential increase of output per input that makes the water engine possible.

In comparison to enormity of output per input of hydrogen atomic energy, the increasingly exponential output per input of energy per heat added to heat-activate the hydrogen of water in the water engine is fractional. However, output of the water engine is free of radioactivity and greater than other non-atomic or non-nuclear sources of prime-mover energy.

The hydrogen and oxygen of water react as though molecularly dissociated by heat-activation and reunited near or after exhaust in the water engine. Whether or to what extent dissociation and reuniting occur is immaterial to output of hydrogen pressure for rotational, thrust or expulsion power. Molecular dissociation is material, however, to optional direct takeoff of hydrogen electrical power from hydrogen electrons for operating the engine and for external uses.

Rotational aspects of the water engine are made possible with the Nelson Turbocam Drive. Longer lasting than gas turbines, it is 98% efficient in converting linear travel to rotary motion from the 3,000-to-30,000 psi against alternately opposite surfaces of a two-way, double-action piston. There is no heated side-pressure friction, which makes use of solid lubrication possible. Power loss and mechanical wear are minimal. Rotational leverage for positive-displacement pressure is higher than for blade-action pressure of turbine engines per pressure-surface area. Mean-effective pressure (mep) can be 1,000-to-8,000 psi in comparison to only 100-to-125 psi for gasoline or diesel engines; up to 80 times higher! The higher pressure is contained with non-gap, thick and close-fitting compression rings that are self-aligned and augmented by gapped centering compression rings.

Salient physical features of the water engine system include previously impossible (1) high mechanical and volumetric efficiencies for rotational features, (2) high mass flow of airflow overrun for atmospheric-thrust features, (3) high velocity of low mass for space-thrust features and (4) high accumulation of pressure rapidly for automatic projectile-expulsion features.

Variably high hydrogen pressure is generated by cyclic hydrogen activators with internal electrical heat of 700°-to-2,200° F. that generates 3,000-to-30,000 psi of water hydrogen. The hydrogen activators are in gaseous communication with pressure-use chambers such as cylinders, thrusters or projectile bores which are emptied cyclically. The cyclic emptying allows injection of spray-atomized water without resistance of compression for hydrogen heat-activation.

Atomically, hydrogen-host fuel use of waster is made possible by molecular combination of oxygen's low-mass nuclear attraction of hydrogen and hydrogen's low-mass proton-nuclear attraction of its electrons. Oxygen's low-mass nuclear attraction of hydrogen allows heat-distancing activation of the hydrogen. Hydrogen's low-mass proton-nuclear attraction of its electrons then allows heat-activation energy of its electrons exponentially per heat added within astrophysical system-net limits of energy conservation.

Contrastingly, for known heat engines that utilize fuels having stored sun energy or other stored terrestrial energy, output is fractional of the stored energy as described by the Carnot Principle of Energy Conservation.

Analogous in physical principle to atomic energy that is achieved by pressure fractionation of hydrogen nuclei with resulting radioactivity and unusably high heat, this is a newly discovered form of hydrogen chemical energy. It employs electrical-heat impairment of hydrogen nuclei without fractionation for activation of the hydrogen electrons of atomized water. As in hydrogen atomic energy, immensely more expansion energy of hydrogen is generated than energy that is required for its generation. An order of magnitude higher hydrogen pressure than gaseous pressure attainable previously from fuel in any known non-nuclear or non-atomic form of usable heat engine is made available without radioactivity and with conveniently usable heat and pressure.

Hydrogen power of water has been plainly visible and duly recorded professionally without its nature and significance being perceived, recognized or acknowledged for over 125 years of existence of the standard steam table and for over 60 years of known hydrogen atomic energy.

Due to low mass of its proton-only nucleus, hydrogen is the only element that significantly increases rate of pressure increase per heat added. Water is the only known molecular substance that contains hydrogen in a proportion and form to which heat can be added for achieving hydrogen chemical energy with increase of rate of pressure increase per heat added.

Non-radioactive hydrogen chemical energy introduced by the water engine allows a higher level of heat activation of molecularly associated hydrogen electrons than possible with known chemical fuels from heat of combustion.

Hydrogen has long been so highly regarded as ultimately the most promising and preferred fuel that the US Government has spent lavishly and worked diligently during more than six decades without success on researching and developing means for cost-effective molecular dissociation and isolation of hydrogen for its use as a fuel for combustion oxidation. By discovering that physical characteristics of water hydrogen are usable for a world-changing water engine, this invention is also an epic discovery.

Failure to recognize water-hydrogen energy and to isolate hydrogen economically for its oxidative use appears to have resulted from conventionally limiting and consequently misleading characterization of hydrogen as only an oxidative fuel instead of more advantageously a working medium with exponential increase of rate of energy output per rate of activation-heat energy applied. As a result, the fuel feature of water hydrogen evidenced by atomic energy, by the standard steam table and by astronomical cycling of hydrogen energy in the universe has not been obvious.

Mass of atomic nuclei determines molecular attraction of electrons to nuclei. High nuclear mass restricts heat expansion of atoms and molecules from heat-activation of electrons by molecular attraction that includes molecular mass attraction. Contrastingly, light nuclei have progressively light atoms. Included are gases with relatively low strength of molecular attraction of electrons and resulting high expansion per heat level.

Consequently, the nucleus of oxygen of molecular water has much stronger molecular attraction of its oxygen electrons and hydrogen atoms than the proton-only nuclei of the two atoms of hydrogen have for hydrogen electrons. This is why steam pressure rises uniformly up to 300 degrees F. Water-hydrogen pressure per higher heat increases rapidly with a "mushroom" effect. This is because rate of expansion per heat level of hydrogen increases exponentially due to its low-mass nucleus while rate of expansion per heat level of oxygen levels off due to higher mass of its nucleus.

For this reason, steam is near totally hydrogen by volume and near totally hydrogen pressure at 1,500 degrees F. with over 15,000 psi, but only 11.76% hydrogen by atomic mass. Although molecularly associated with oxygen as $H_2O$, hydrogen is, therefore, a self-energized working-medium fuel with the water engine in all of its universal-use forms that can replace all present fuel, mechanized energy and engine systems for atmospheric and exoatmospheric uses.

BRIEF DESCRIPTION OF DRAWINGS

This invention is described by appended claims in relation to description of preferred embodiments with reference to the following drawings which are explained briefly as follows:

FIG. 7 is a partially cutaway end view of a turbocam drive for converting reciprocation to rotational power output of the water engine;

FIG. 8 is a straightened side view of a section of a double-end cam, a follower gear, follower teeth, follower bases, transverse slots and transverse guide for the turbocam drive;

FIG. 9 is a diagram of a section of pump-follower travel for an atomizer pump;

FIG. 10 is a straightened side view of a section of a counterweight end cam showing a relatively flat angle of a counterweight cam channel for damping vibration with a counterweight designedly heavier than reciprocating parts of the water engine;

FIG. 12 is a partially cutaway side view of a water engine as a compound reaction engine with a plug nozzle having straight gas flow for high-speed orbital travel;

FIG. 13 is a partially cutaway side view of a water engine as a compound reaction engine with magnetic acceleration of hydrogen gases to an acceleration thruster aft of the plug nozzle of the FIG. 12 illustration for thrust acceleration in deep space;

FIG. 14 is a partially cutaway side view of a water engine as a compound expulsion engine;

FIG. 16 is a partially cutaway side view of a water engine as a reaction engine employing a thruster with activated hydrogen of superheated steam directly from an activation bore of the hydrogen activator;

FIG. 17 is a partially cutaway side view of the hydrogen activator with hydrogen discharge directly to reaction-engine heater element for a compound reaction engine;

FIG. 23 is a partially cutaway side view of a water engine as a compound reaction engine having a porous electromagnetic accelerator intermediate the reaction-engine heater element and the plug nozzle of the FIG. 12 illustration for deep-space travel faster than light;

FIG. 24 is a partially cutaway fragmentary side view of an atomization portion of a hydrogen activator having a finned heater element in electrical contact with the electrical lead;

FIG. 25 is an end view of the FIG. 24 illustration showing electrical contact of the electrical lead with the finned heater element;

FIG. 26 is a partially cutaway fragmentary side view of the atomization portion of a hydrogen activator having a finned-plug heater element in electrical contact with the electrical lead;

FIG. 27 is an end view of the FIG. 26 illustration showing electrical contact of the electrical lead with the finned-plug heater element;

FIG. 28 is a partially cutaway fragmentary side view of the atomization portion of a hydrogen activator having a porous heater element in electrical contact with the electrical lead;

FIG. 29 is an end view of the FIG. 28 illustration showing electrical contact of the electrical lead with the porous heater element; and FIG. 30 is a partially cutaway side view of an expulsion engine.

DESCRIPTION OF PREFERRED EMBODIMENTS

This invention is described with reference to assigned numbers for designating the same features throughout a description of preferred embodiments of the invention, on drawing FIGS. and in patent claims as follows.

Figure 1:
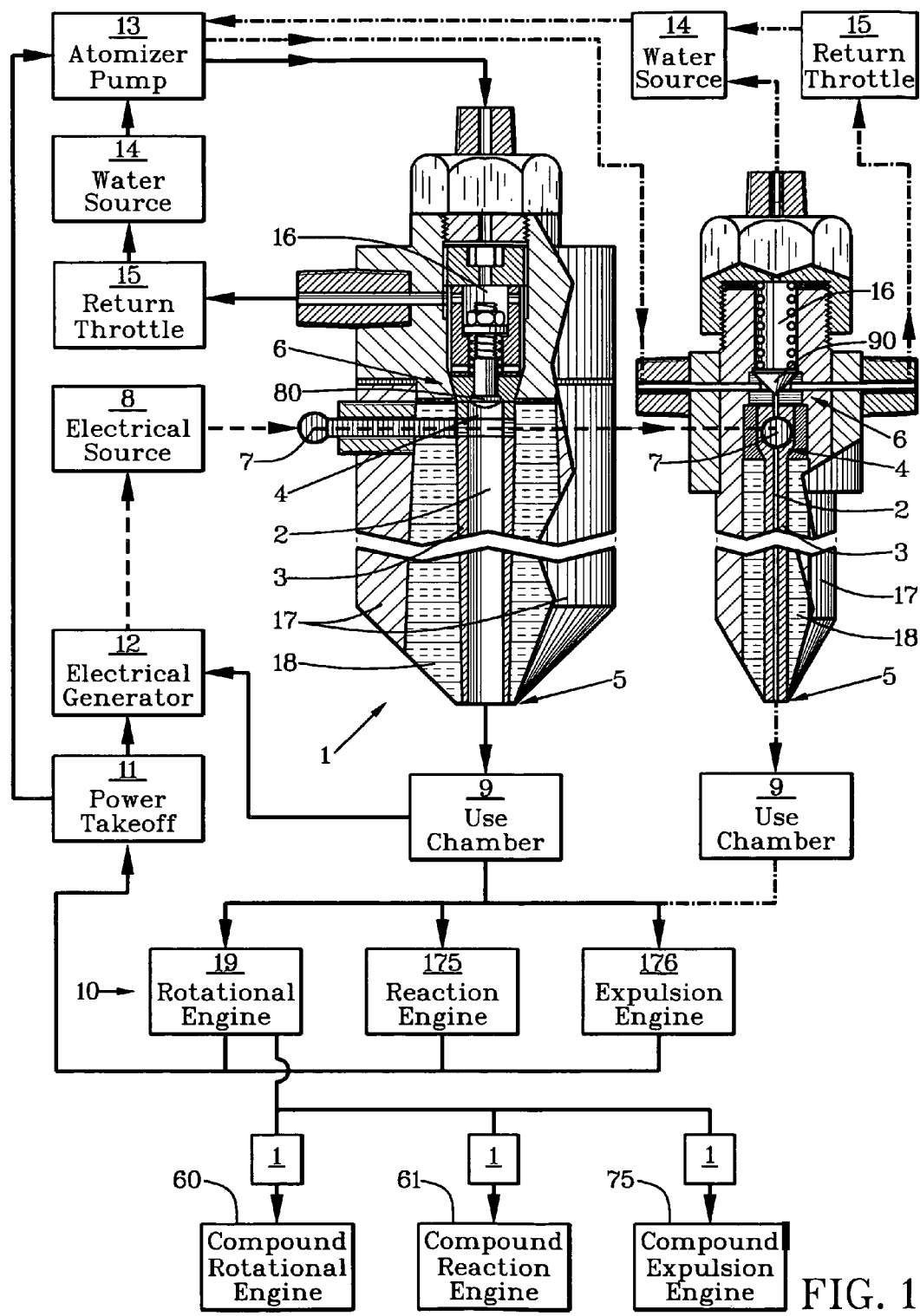
FIG. 1 is a partially cutaway plan view of a flow diagram of a water-engine method with working relationship of apparatus parts to cutaway elevation drawings of two preferred hydrogen activators and numbered box representations of features of this invention.
Figure 18:
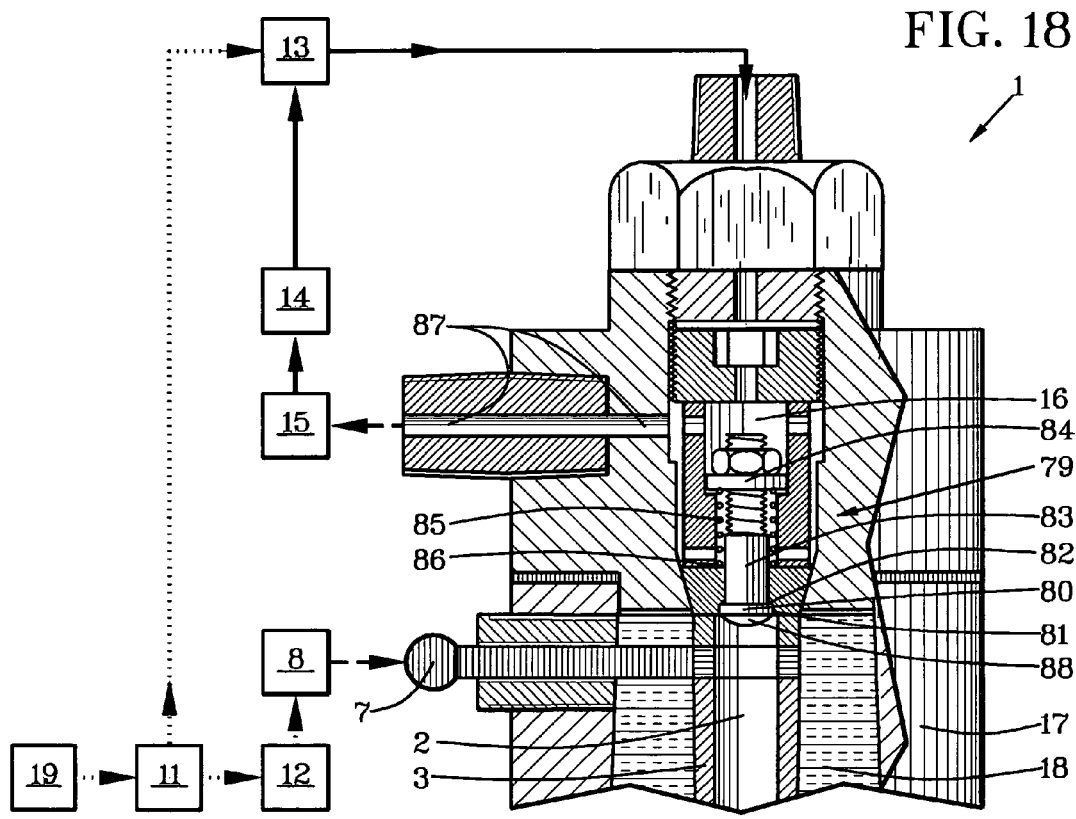
FIG. 18 is an enlarged partially cutaway side view of an atomizer portion of the hydrogen activator having a circumferential atomization valve.
Figure 19:
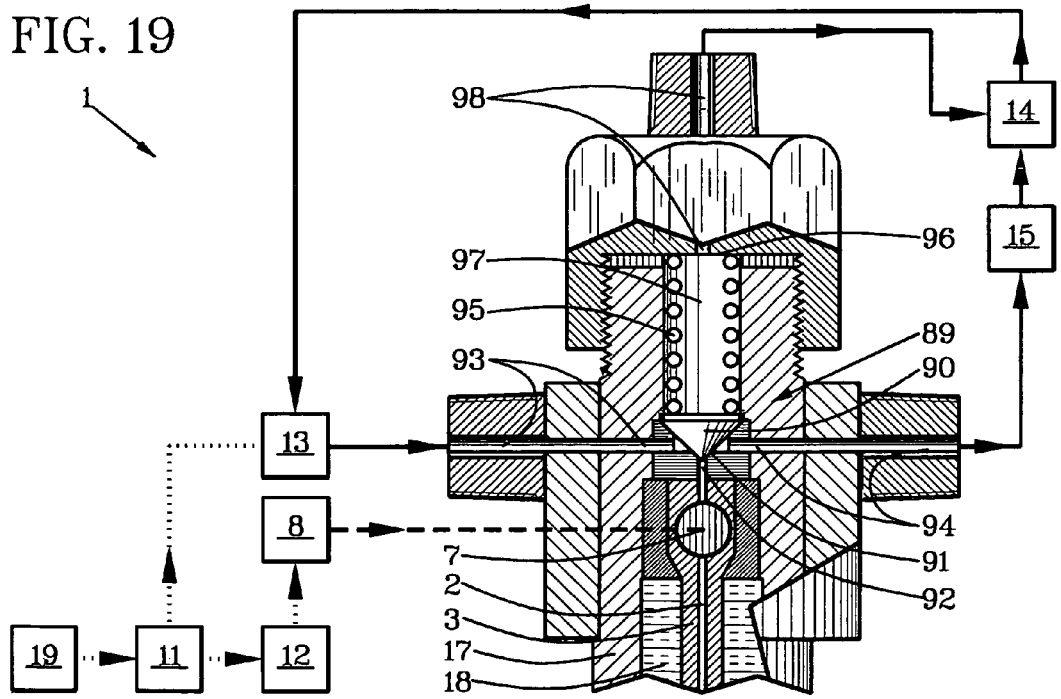
FIG. 19 is an enlarged partially cutaway side view of an atomizer portion of the hydrogen activator having an orificial atomization valve.

Referring to FIGS. 1 and 18-19, a method for heat-activating hydrogen energy of water is provided by injection-atomizing water through an atomizer (6) on a hydrogen activator (1) having internal heat in an activation bore (2) for heat-activating water hydrogen to pressure levels for achieving hydrogen pressure of superheated steam for intended objectives. The hydrogen pressure of the superheated steam is directed into at least one use chamber (9) structured for achieving at least one of the intended objectives.

A portion of power from a power takeoff (11) is utilized for generating electricity for electrically heating heater element (3) of the activation bore (2). With this invention, exponentially more output pressure energy from heat-activating hydrogen electrons of water hydrogen is generated than mechanical energy or direct electrical transfer for generation of electrical energy required for heat-activating the water hydrogen pressure of superheated steam.

At least one hydrogen activator (1) has an activation bore (2) with heater element (3) intermediate an inlet end (4) and an outlet end (5) of the activation bore (2) predeterminedly. An atomizer (6) is placed in fluid-inlet communication with the inlet end (4) of the activation bore (2). An electrical lead (7) is placed in electrical communication from an electrical source (8) to the heater element (3). Atomized water is directed from the atomizer (6) into fluid communication with the heater element (3) of the activation bore (2).

Hydrogen of the atomized water in the activation bore (2) is heat-activated by applying electricity from the electrical source (8) to the heater element (3) for electrical-resistance heating of the atomized water with the heater element (3) predeterminedly.

The outlet end (5) of the activation bore (2) is placed in fluid communication with at least one use chamber (9) of at least one pressure-use mechanism predeterminedly. Activated hydrogen pressure resulting from heating the atomized water in the activation bore (2) is utilized in the use chamber (9) of the pressure-use mechanism predeterminedly.

The pressure-use mechanism can include a predetermined engine (10). A power takeoff (11) is positioned in power-takeoff communication with the predetermined engine (10).

An electrical generator (12) is positioned with operational power transmission from the power takeoff (11) for generating electricity with the electrical generator (12).

Electricity is transmitted from the electrical generator (12) to the electrical source (8). An atomizer pump (13) is positioned in predetermined fluid-pumping communication from a water source (14) to the atomizer (6). A return throttle (15) is provided and positioned with controllable return flow of water from an atomizer inlet (16) to the water source (14) for forcing throttle-restricted flow of water through the atomizer (6) selectively.

As shown with enlargement for greater detail in FIG. 18, the atomizer (6) can include a circumferential-atomization valve (79) having a cylindrical valve head (80) reciprocative within a predetermined atomization-clearance area internally from a cylindrical valve sleeve (81) for discharging circumferentially atomized water or other fluid downstream fluidly from the cylindrical valve head (80) into the activation bore (2). A circumferential valve seat (82) is positioned upstream fluidly from the cylindrical valve head (80) and the cylindrical valve sleeve (81). A valve stem (83) is projected orthogonally from an upstream face of the cylindrical valve head (80) to a spring retainer (84) on the valve stem (83) proximate the atomizer inlet (16). An expansion-pressure spring (85) has expansion pressure in communication intermediate the spring retainer (84) and a spring base (86) upstream fluidly from the circumferential valve seat (82). A return conveyance (87) is positioned intermediate the atomizer inlet (16) and the return throttle (15). A bore face (88) of the cylindrical valve head (80) in fluid communication with the activation bore (2) is provided for directing valve-closing pressure of activated hydrogen from the activation bore (2) against the bore face (88) for closure of the circumferential-atomization valve (79) by pressurized engagement of the cylindrical valve head (80) with the circumferential valve seat (82) after forcing water or other fluid through the circumferential-atomization valve (79) by restrictive throttling of flow of fluid through the return throttle (15).

As shown with enlargement for greater detail in FIG. 19, the atomizer (6) can include an orificial-atomization valve (89) having a tapered valve head (90) with a tapered tip movable against a tapered valve seat (91) with a tapered inside periphery structured for receiving a tapered surface of the tapered valve head (90). The tapered valve seat (91) has a valve orifice (92) at a minor-diameter bottom with an inside periphery sized for atomizing pressurized water or other fluid with the tapered tip of the tapered valve head (90) removed from the valve orifice (92) predeterminedly and selectively. An inlet conveyance (93) is in fluid communication from the atomizer pump (13) to the tapered valve seat (91). An orificial return conveyance (94) is in fluid communication from the tapered valve seat (91) to the return throttle (15). A closure spring (95) is positioned with predetermined expansion pressure intermediate a major-diameter face of the tapered valve head (90) and a return wall (96) of a pressure-bleed cylinder (97). A pressure-bleed conveyance (98) is in fluid communication intermediate the pressure-bleed cylinder (97) and the water source (14). The return throttle (15) is structured for forcing water or other fluid through the orificial atomization valve (89) and past the tapered valve head (90). The inlet conveyance (93) and the return conveyance (94) are structured and positioned for fluid flow through the tapered valve seat (91), through the valve orifice (92) and minimally past the tapered valve head (90) by throttling pressure of fluid from the atomizer pump (13) selectively.

Hydrogen activators (1) having atomizers (6) with the cylindrical valve head (80) and the tapered valve head (90) are interchangeable functionally for particular use conditions and objectives.

Atomizers (6) with the cylindrical valve head (80) are intended for use conditions with higher pressure in use chambers (9) than for hydrogen activators (1) with the tapered valve head (90).

In FIG. 1, hydrogen activators (1) having the atomizers (6) with the cylindrical valve head (80) and with the tapered valve head (90) are shown side-by-side. The hydrogen activator (1) having the cylindrical valve head (80) is shown on the left side with solid lines to and from the atomizer pump (13) and to the use chamber (9) for indicating its preference for high-pressure use conditions. The hydrogen activator (1) having the tapered valve head (90) is shown on the right side with dot-dash-dot lines to and from the atomizer pump (13) and to the use chamber (9) for indicating its optional use for lower pressure conditions.

Figure 15:
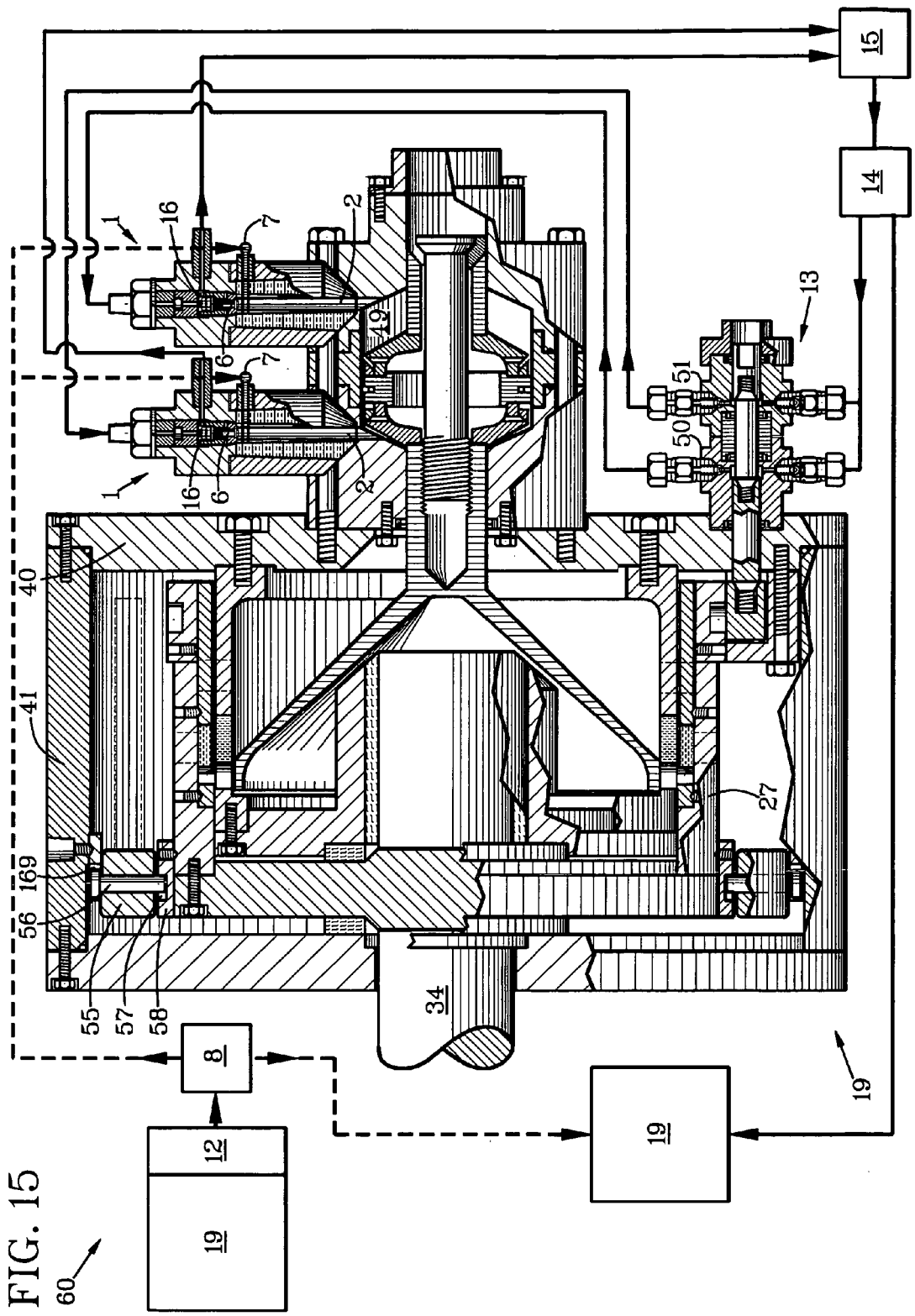
FIG. 15 is a partially cutaway side view of a water engine as a compound rotational engine.

The use chambers (9) can include either of at least (A) cylinders for a rotational engine described in relation to FIGS. 2-6, (B) cylinders for a compound rotational engine described in relation to FIG. 15, (C) thrust chambers for reaction engines described in relation to FIG. 16, (D) thrust chambers for compound reaction engines described in relation to FIGS. 11-13 and 23 and, (E) projectile breeches (76) for compound expulsion engines as described in relation to FIG. 14 designedly.

The electrical generator (12) can be operated mechanically through the power takeoff (11) or directly with electrical transmission from hydrogen that is molecularly dissociated by heat-activation in the activation bore (2).

Engine compounding for compound rotation, reaction and expulsion engines is distinguished by sharing of electrical and/or one or more other engine features by two or more engines.

Figure 2:
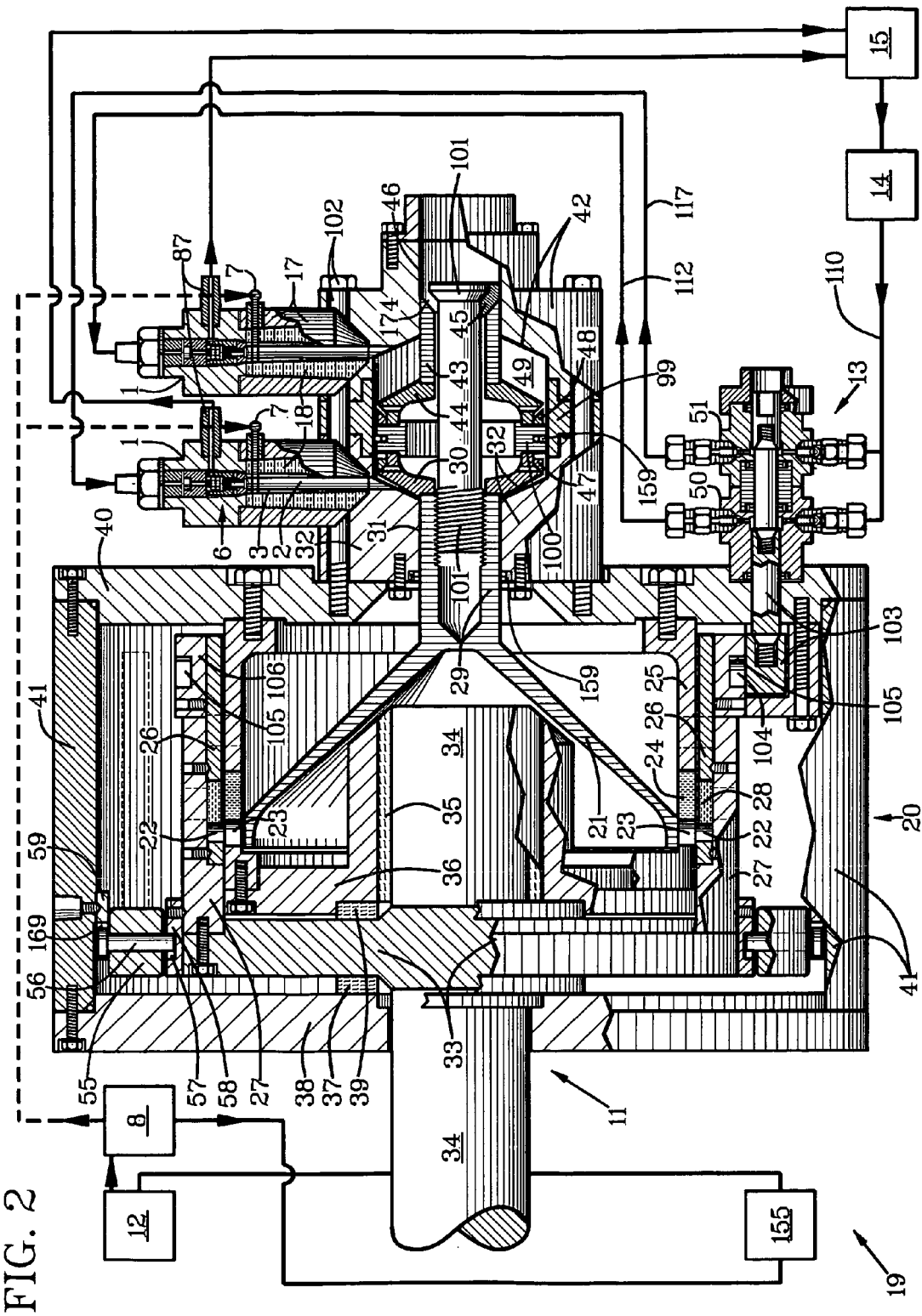
FIG. 2 is a partially cutaway side view of a preferred rotational water engine powered by activated water hydrogen and having total vibration damping with a cam-driven counterweight.
Figure 3:
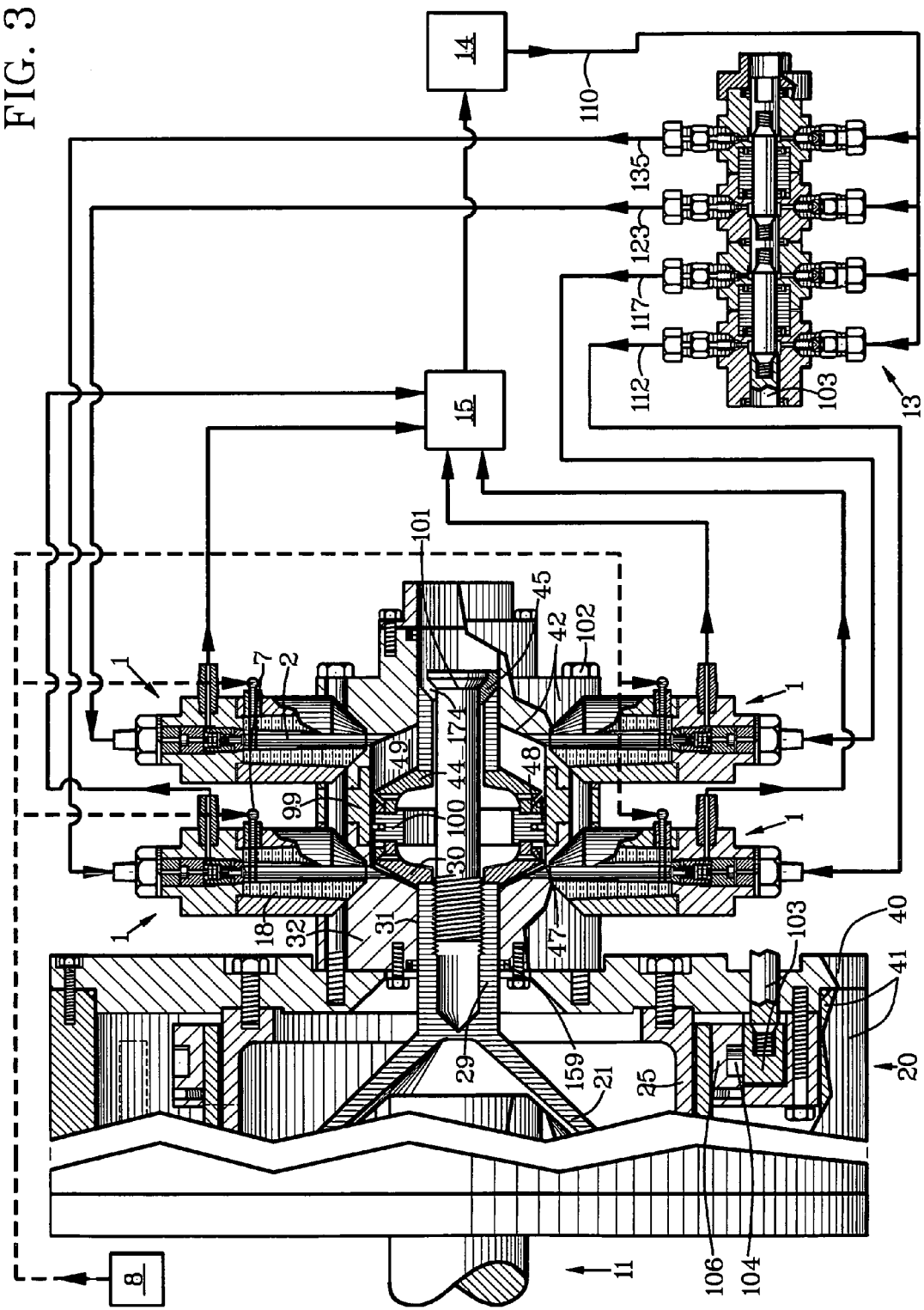
FIG. 3 is a partially cutaway side view of a piston section of the rotational water engine having four hydrogen activators and a four-unit atomization pump.

Referring to FIG. 2, an embodiment of a water engine in accordance with this method has the at least one hydrogen activator (1) having the activation bore (2) with the heater element (3) positioned axially intermediate the inlet end (4) and the outlet end (5) of the activation bore (2) predeterminedly.

The heater element (3) is insulated electrically and at least in part insulated thermally from an activator casing (17) by element insulation (18) encompassing the heater element (3) circumferentially intermediate the heater element (3) and the activator casing (17).

The atomizer (6) is in fluid-atomizing communication from the atomizer inlet (16) to the inlet end (4) of the activation bore (2) predeterminedly.

The electrical lead (7) is in electrical communication from the electrical source (8) to the heater element (3).

The outlet end (5) of the activation bore (2) of the at least one hydrogen activator (1) is in fluid communication with at least one use chamber (9) of a selected pressure-use mechanism predeterminedly.

The selected pressure-use mechanism can include a predetermined water engine (10). The water engine (10) can include a rotational engine (19) with features described in relation to FIGS. 2-10,15 and 18-22.

As shown in FIG. 2 and with enlargement detail in FIGS. 7-10 and 18-22, the rotational engine (19) has a turbocam drive (20) with a follower gear (21) having a plurality of follower teeth (22) extended radially from follower bases (23) in sliding contact with rotationally transverse walls of transverse slots (24) in a transverse guide (25).

The transverse guide (25) is positioned circumferentially intermediate the follower gear (21) and a double-end cam (26) proximate an inside periphery of an end-cam sleeve (27).

The follower teeth (22) are in cam-drive contact with alternately opposite-side walls of a counter-inclined channel (28) of the double-end cam (26).

A drive-piston sleeve (29) is positioned circumferentially intermediate the follower gear (21) and a drive head (30) of a double-action piston with the drive-piston sleeve (29) in sliding-seal contact with an inside periphery of a drive-head sleeve (31) of a drive-end head (32) of a double-headed power cylinder (49).

The end-cam sleeve (27) has a drive end attached to a drive-shaft plate (33) that is extended inwardly to a drive shaft (34) which is in rotational contact with an inside periphery of a drive-shaft bearing (35) in a shaft-housing plate (36).

A front thrust bearing (37) is positioned axially intermediate the drive-shaft plate (33) and a drive-housing plate (38).

A rear thrust bearing (39) is positioned axially intermediate the drive-shaft plate (33) and the shaft-housing plate (36).

A base plate (40) is attached predeterminedly to the drive-end head (32) and extended outward radially to a drive-housing sleeve (41) which has a drive end attached to the drive-housing plate (38) and a piston end attached to the base plate (40).

The double-action piston is in sliding-seal contact with a sleeve portion of a drive end of the drive-end head (32) and a sleeve portion of an exhaust end of an exhaust-end head (42) of the double-headed power cylinder (49) predeterminedly.

An exhaust-end sleeve (43) is positioned intermediate an exhaust head (44) and a tie-bolt anchor (45) with the exhaust-end sleeve (43) being in sliding-seal contact with an inside periphery of an exhaust-head sleeve (46) of the exhaust-end head (42). The tie-bolt anchor (45) has at least one exhaust port (174) in fluid communication intermediate an inside periphery of the exhaust-end sleeve (43) and an inside periphery of the exhaust-head sleeve (46).

Consisting of basically the drive head (30) and the exhaust head (44), the double-action piston is preferably truncate-conical and hollow on opposite sides intermediate at least one front piston valve (47) and at least one rear piston valve (48).

A front valve aperture (160) of the front piston valve (47) is structured for being in open fluid communication intermediate an inside periphery of the drive head (30) of the double-action piston and the drive-end head (32) of the double-headed power cylinder (49) during forward travel of the double-action piston towards the drive-end head (32) and for being closed during rearward travel of the double-action piston towards the exhaust-end head (42).

A rear valve aperture (161) of the rear piston valve (48) is structured for being in open fluid communication intermediate the inside periphery of the exhaust head (44) of the double-action piston and the exhaust-end head (42) of the double-headed power cylinder (49) during the rearward travel of the double-action piston towards the exhaust-end head (42) and for being closed during the forward travel of the double-action piston towards the drive-end head (32).

Figure 22:
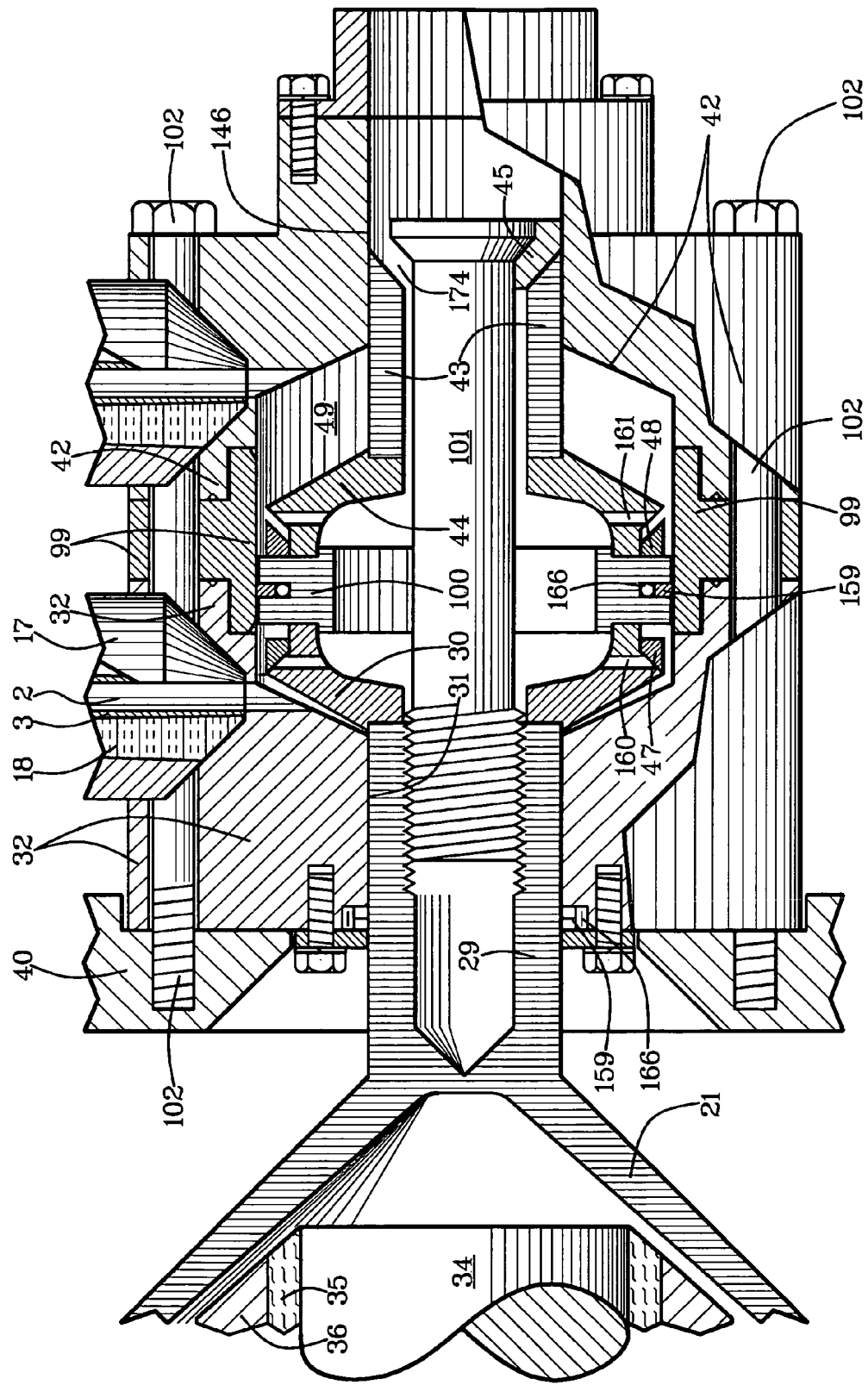
FIG. 22 is an enlarged partially cutaway side view of solid, non-gap, close-fit and wide high-pressure piston ring and shaft sealing with floating concentricity that self-centers the cylinder heads, two piston heads and a cylinder sleeve with the turbocam drive of the rotational water engine.

For a preferred embodiment of the front piston valve (47) as shown with enlargement detail in FIG. 22, reciprocating directional change of the double-action piston from-forward-to-rearward travel causes momentum closure of the front piston valve (47) against a valve-seat wall where the front valve aperture (160) is closed thereby. Simultaneously, gaseous pressure of activated water hydrogen or other gas bypasses the front piston valve (47) in a circumferential gap between an outside periphery of the front piston valve (47) and an inside periphery of a cylinder-seal sleeve (99) for closure pressure against an orthogonal surface of a back side of the front piston valve (47).

Correspondingly opposite for a preferred embodiment of the rear piston valve (48) as shown with enlargement detail in FIG. 22, reciprocating directional change of the double-action piston from-rearward-to-forward travel causes momentum closure of the rear piston valve (48) against a valve-seat wall where the rear valve aperture (161) is closed thereby. Simultaneously, gaseous pressure of activated water hydrogen or other gas bypasses the rear piston valve (48) in a circumferential gap between an outside periphery of the rear piston valve (48) and an inside periphery of the cylinder-seal sleeve (99) for closure pressure against an orthogonal surface of a back side of the rear piston valve (48).

The front valve aperture (160) operated by the front piston valve (47) is opened by directional change of travel of the double-action piston from-rearward-to-forward travel. Correspondingly opposite, the rear valve aperture (161) operated by the rear piston valve (48) is opened by directional change of travel of the double-action piston from-forward-to-rearward travel.

At least one hydrogen activator (1) is in fluid communication with a drive end of the double-headed power cylinder (49) for directing heat-activated gas pressure from the activation bore (2) of the hydrogen activator (1) against the drive head (30) of the double-action piston for actuating the rearward travel of the double-action piston.

At least one hydrogen activator (1) is in fluid communication with an exhaust end of the double-headed power cylinder (49) for directing heat-activated gas pressure from the activation bore (2) of the hydrogen activator (1) against the exhaust head (44) of the double-action piston for actuating the forward travel of the double-action piston.

The electrical lead (7) for the hydrogen activator (1) in fluid communication with the drive end of the double-headed power cylinder (49) and the electrical lead (7) for the hydrogen activator (1) in fluid communication with the exhaust end of the double-headed power cylinder (49) are in electrical communication with the electrical source (8).

The atomizer (6) for the hydrogen activator (1) in fluid communication with the exhaust end of the double-headed power cylinder (49) is in fluid communication with a first activator pump (50) of the atomizer pump (13).

The atomizer (6) for the hydrogen activator (1) in fluid communication with the drive end of the double-headed power cylinder (49) is in fluid communication with a second activator pump (51) of the atomizer pump (13).

The atomizer inlet (16) shown in FIG. 1 for the hydrogen activator (1) in fluid communication with the drive end of the double-headed power cylinder (49) and the atomizer inlet (16) for the hydrogen activator (1) in fluid communication with the exhaust end of the double-headed power cylinder (49) are in return-fluid communication with the return throttle (15).

Figure 6:
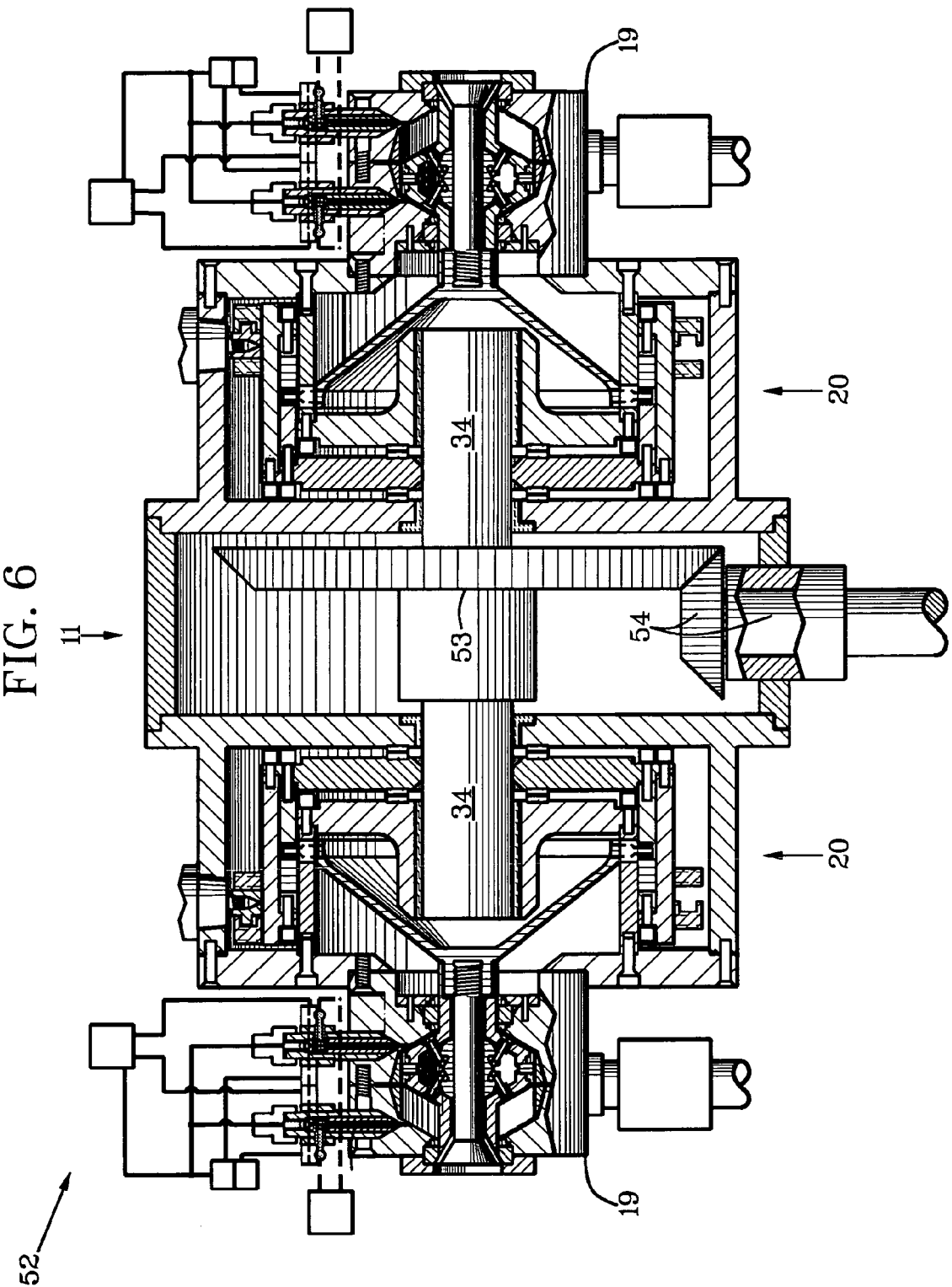
FIG. 6 is a partially cutaway side view of a shaft-to-shaft duo water engine for total vibration damping.

Referring to FIG. 6, the rotational engine (19) can include a dual engine (52) having the drive shaft (34) of a first rotational engine (19) coupled linearly to the drive shaft (34) of a second rotational engine (19) for vibration-damping with opposed-reciprocating travel of reciprocating parts of the double-action piston and turbocam drive (20) of the first rotational engine (19) and reciprocating parts of the double-action piston and turbocam drive (20) of the second rotational engine (19). The power takeoff (11) includes a coupling gear (53) having output drive of a takeoff gear (54).

As shown for vibration damping in FIGS. 2, 10 and 15, the rotational engine (19) can have a counterweight (55) for vibration damping by counterbalancing reciprocating travel of reciprocating parts of the double-action piston and the turbocam drive (20). The counterweight (55) is attached to a counterweight cam follower (56) having a bottom follower end in a counter-inclined counterweight cam channel (57) of a counterweight end cam (58) on an outside periphery of the end-cam sleeve (27). A top portion of the counterweight cam follower (56) is in sliding contact with linear walls of a counterweight guide channel (169) in a counterweight transverse guide (59) attached to a drive-housing member which can include the drive-housing sleeve (41), for arresting rotation of the counterweight (55) from rotation of the counterweight end cam (58).

Referring to FIGS. 2, 5, 8, 10 and 15, travel distance of the counterweight (55) is predeterminedly less than travel distance of an assembly of the double-action piston and the follower gear (21) in order to provide a flatter angle of the counterweight cam channel (57) with greater mechanical advantage for cam actuation of channel-wall surfaces of the counterweight cam channel (57) against the counterweight cam follower (56) for reciprocating actuation of an adequately heavy counterweight (55).

Conversely, as illustrated in FIG. 8, drive angle of the counter-inclined channel (28) can have steepness that is idealized for mechanical advantage of cam actuation of channel walls of the counter-inclined channel (28) by the follower teeth (22). For use conditions with only output power, such as for generation of electrical power and operating pumps, steepness of the drive angle can be approximately fifteen degrees from axial travel of the follower teeth (22) and the follower bases (23) on the assembly of the follower gear (21) and the double-action piston.

For use conditions with both output power and input power, such as for a motor vehicle with occasional input power from vehicle wheels in addition to operational output power from the water engine to the vehicle wheels, steepness of the drive angle is preferably thirty-to-thirty-five degrees from axial travel of the follower teeth (22) on the assembly of the follower gear (21) and the double-action piston.

Capability for idealizing the drive angle is a fundamental advantage of the rotational engine (19) having the turbocam drive (20) for this invention. It enables use life comparable to or greater than for turbine-engine systems. Length of rotational leverage can be longer instead of shorter per stroke distance of piston travel. Short strokes of truncate-conically tapered pistons allow greater area of piston surface per surface area of cylinder walls with resultantly greater pressure-use efficiency. There is no piston side pressure or wear that is increased per speed by swinging connecting rods of crankshaft engines.

Power output is more nearly constant with preferably sixteen follower teeth (22) for providing thirty-two power strokes per engine revolution with only one piston. This is as many power strokes per revolution as for a conventional engine with one-hundred-and-twenty-eight cylinders! In addition, operational mean-effective pressure (mep) is up to fifty times higher; effective rotational leverage is eight times higher; more of the pressure is used against a piston surface; and there is far less friction loss. Heavy and highly durable metal parts are close together with relatively little space between them. These features make the water engine highly powerful per weight, but heavy per small size.

Engine sizes of 200-to-1,200 brake horsepower for cars, trucks, heavy equipment and trains can have 3-to-5 horsepower per pound instead of multiple pounds per horsepower for conventional engines. Reaction-propulsion engines can be less than one-third of the weight per thrust of turbine-engine systems.

Due to long rotational leverage and high mep, rotational torque can be 25-to-50 foot-pounds per horsepower instead of only 1-to-5 foot-pounds per horsepower of conventional engines.

Prior cam-drive engines, known generally as "barrel engines," have detrimentally flat drive angles of inherently 60-to-75 degrees from linear cam-follower travel in order to allow for circumferential placement of pistons with cam-follower relationship to cam surfaces. This has resulted in adversely short use life instead of the highly advantageous long use life of water engines with the turbocam drive.

Totally opposite effects of longer use life than rotational features of any other engine system are provided by the turbocam drive (20) for the water engine. Longer use life in addition to use of only water as fuel make the water engine incomparably preferable to prior fuel engines for all uses, including rotational, reactionary thrust and projectile expulsion as taught by this invention.

The water engine (10) can include a compound engine.

Referring to FIGS. 1-2 and 15, the compound engine can include a compound rotational engine (60) having one rotational engine (19) with the electrical generator (12) and the electrical source (8) structured and positioned for supplying electrical current to at least one other rotational engine (19). The electrical source (8) is in electrical communication with the electrical lead (7) for at least one hydrogen activator (1) of the at least one other rotational engine (19) having the activation bore (2) in fluid communication with the drive end of the double-headed power cylinder (49) and having the electrical source (8) in electrical communication with the electrical lead (7) for the at least one hydrogen activator (1) of the at least one other rotational engine (19) having the activation bore (2) in fluid communication with the exhaust end of the double-headed power cylinder (49).

Figure 11:
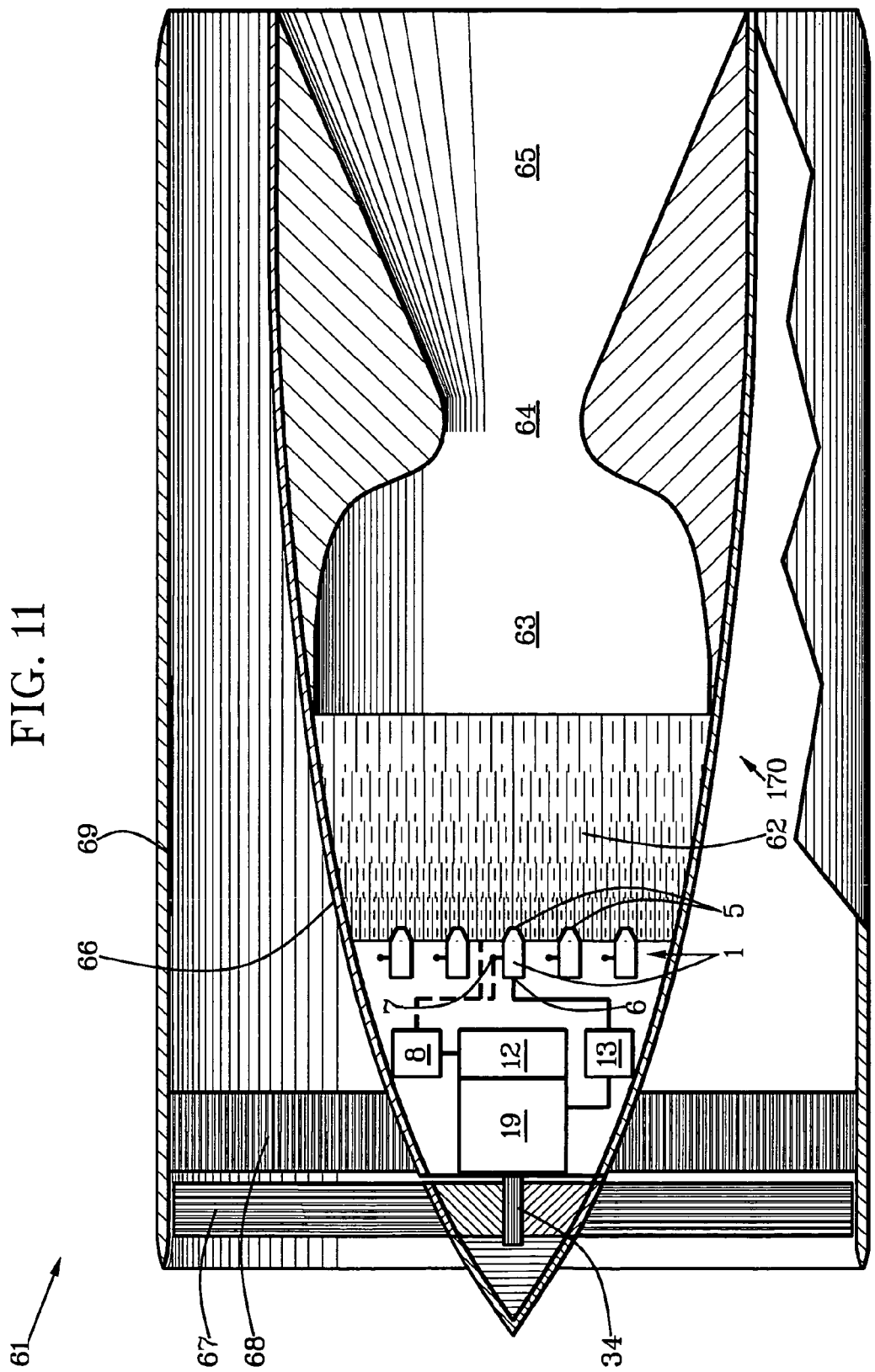
FIG. 11 is a partially cutaway side view of a water engine as a compound reaction engine with bypass-air augmentation and a skirt nozzle for atmospheric thrust.

Referring to FIGS. 1-2 and 11, the compound engine can include a compound reaction engine (61) having the rotational engine (19) with the generator (12) and the electrical source (8) structured and positioned for supplying electrical current for secondary heat of reaction-engine heater element (62) for the compound reaction engine (61). The electrical source (8) is in electrical communication with the electrical lead (7) of at least one hydrogen activator (1) for the compound reaction engine (61). The atomizer pump (13) is in fluid communication with the atomizer (6) of the at least one hydrogen activator (1) of the compound reaction engine (61). The outlet end (5) of the hydrogen activator (1) is positioned for fluid communication from the activation bore (2) to the reaction-engine heater element (62) upstream fluidly from a reaction thruster for the compound reaction engine (61).

The reaction thruster can have a skirt nozzle (170) with the reaction-engine heater element (62) being structured and positioned intermediate the at least one hydrogen activator (1) and a skirt-nozzle pressure chamber (63) upstream fluidly from a skirt-nozzle venturi (64) in fluid communication with a nozzle skirt (65) in a skirt-nozzle engine housing (66).

The compound reaction engine (61) can include a bypass fan (67) attached axially to the drive shaft (34) for providing mass of airflow in a path of gas having high velocity downstream fluidly from the nozzle skirt (65). Also included can be a plurality of flow straighteners (68) downstream fluidly from the bypass fan (67) within a bypass housing (69) structured and positioned for directing the mass of airflow downstream intermediate an outside periphery of the skirt-nozzle engine housing (66) and an inside periphery of the bypass housing (69).

Referring to FIGS. 1-2 and 11-12, the reaction thruster can include a plug nozzle (168) for which the reaction-engine heater element (62) is structured and positioned intermediate the at least one hydrogen activator (1) and a plug-nozzle pressure chamber (164) upstream fluidly from a plug-nozzle venturi (70) in fluid communication with a straight nozzle (71) in a straight-nozzle housing (72) of the plug nozzle (168).

Referring to FIGS. 1-2 and 11-13, an electromagnetic accelerator (73) can be positioned intermediate the plug-nozzle venturi (70) and an acceleration thruster (74) structured for achieving deep-space speed acceleration.

Referring to FIGS. 1-2, 11-13 and 23, a porous electromagnetic accelerator (167) having axial fluid conveyance can be positioned intermediate the reaction-engine heater element (62) and the plug-nozzle pressure-chamber (164) of the plug nozzle (168) for achieving deep-space speed faster than light.

Referring to FIGS. 1-2 and 14, the compound engine can include a compound expulsion engine (75) having the electrical source (8) in electrical communication with the electrical lead (7) for at least one hydrogen activator (1). The atomizer pump (13) is in fluid communication with the atomizer (6) of the at least one hydrogen activator (1) of the compound expulsion engine (75). A projectile breech (76) is structured and positioned intermediate the activation bore (2) and a projectile bore (77) for positioning projectiles (78) for expulsion through the projectile bore (77) predeterminedly.

Referring to FIGS. 11-13, 17 and 23, the reaction-element heater element (62) can include a selection of heater element having axial fluid conveyance. Preferably, the reaction-engine heater element (62) is gradational in fluid conveyance and heat exchange as illustrated by gradation of density of heat-exchange lines and dashes downstream fluidly from at least one hydrogen activator (1).

Referring to FIGS. 2-4, 7-8, 15 and, for enlargement detail, to FIG. 22, the drive-end head (32) can be positioned laterally and collinearly against the base plate (40) for locating the drive-head sleeve (31) concentrically to the drive-piston sleeve (29). For axial concentricity of seal positioning, a cylinder-seal sleeve (99) is positional laterally and collinearly intermediate the drive-end head (32) and the exhaust-end head (42) of the double-headed power cylinder (49) for locating the cylinder-seal sleeve (99) concentrically to the drive-head sleeve (31) and concentrically to the double-action piston with the follower gear (21) being supported concentrically to the transverse guide (25) and with the follower bases (23) in sliding contact with walls of the transverse slots (24).

A high-pressure piston ring (100) is locatable laterally and collinearly intermediate the drive head (30) and the exhaust head (44) of the double-action piston. The high-pressure piston ring (100) is a solid, non-gap ring having relatively wide predetermined width and predeterminedly close-fit seal against an inside periphery of the cylinder-seal sleeve (99).

A tie bolt (101) is extended intermediate a tie-bolt anchor (45) on the exhaust end of the exhaust-end sleeve (43) and the drive-piston sleeve (29). A drive end of the tie bolt (101) is threaded into an inside periphery of the drive-piston sleeve (29).

A plurality of head bolts (102) are threaded into the base plate (40) from an exhaust end of the exhaust head (45).

A resultant floating lateral and collinear location of the drive-end head (32), the cylinder-seal sleeve (99), the high-pressure piston ring (100) and the exhaust-end head (42) provides self-centering concentrically to the drive-piston sleeve (29) on the follower gear (21) automatically by tightening of the tie bolt (101) with wrench access through the exhaust-head sleeve (46) and by tightening of the head bolts (102) with outside wrench access.

Close-fit sealing of sliding contact for sealing gas pressures in excess of two-thousand psi requires wider width of sliding seals than conventionally gapped piston rings for conventional engines. A plurality of in-line sliding seals requires concentricity to prevent binding contact of sliding-contact surfaces. The gas pressures of activated water hydrogen are generally in excess of three-thousand psi for requiring these sliding-seal features.

Centering compression rings (159) can be employed in addition to close-fit sealing for all sliding seals to aid both self-centering and close-fit sealing. The centering compression rings (159) can have groove-bottom springs (166) that are preferably wave springs or side-pressured coil springs to force the centering compression rings (159) concentrically outward to aid self-centering of sliding-contact surfaces.

Any pressure bypass of sliding seals resulting from higher pressure than can be retained by this sliding-seal arrangement is negligible and is discharged through double-action structure of the piston system without adverse effect.

Truncate-conically tapered structure of the drive head (30) and the exhaust head (44) of the double-action piston provides high strength per metal thickness in addition to high pressure-surface area per radial piston area.

Figure 20:
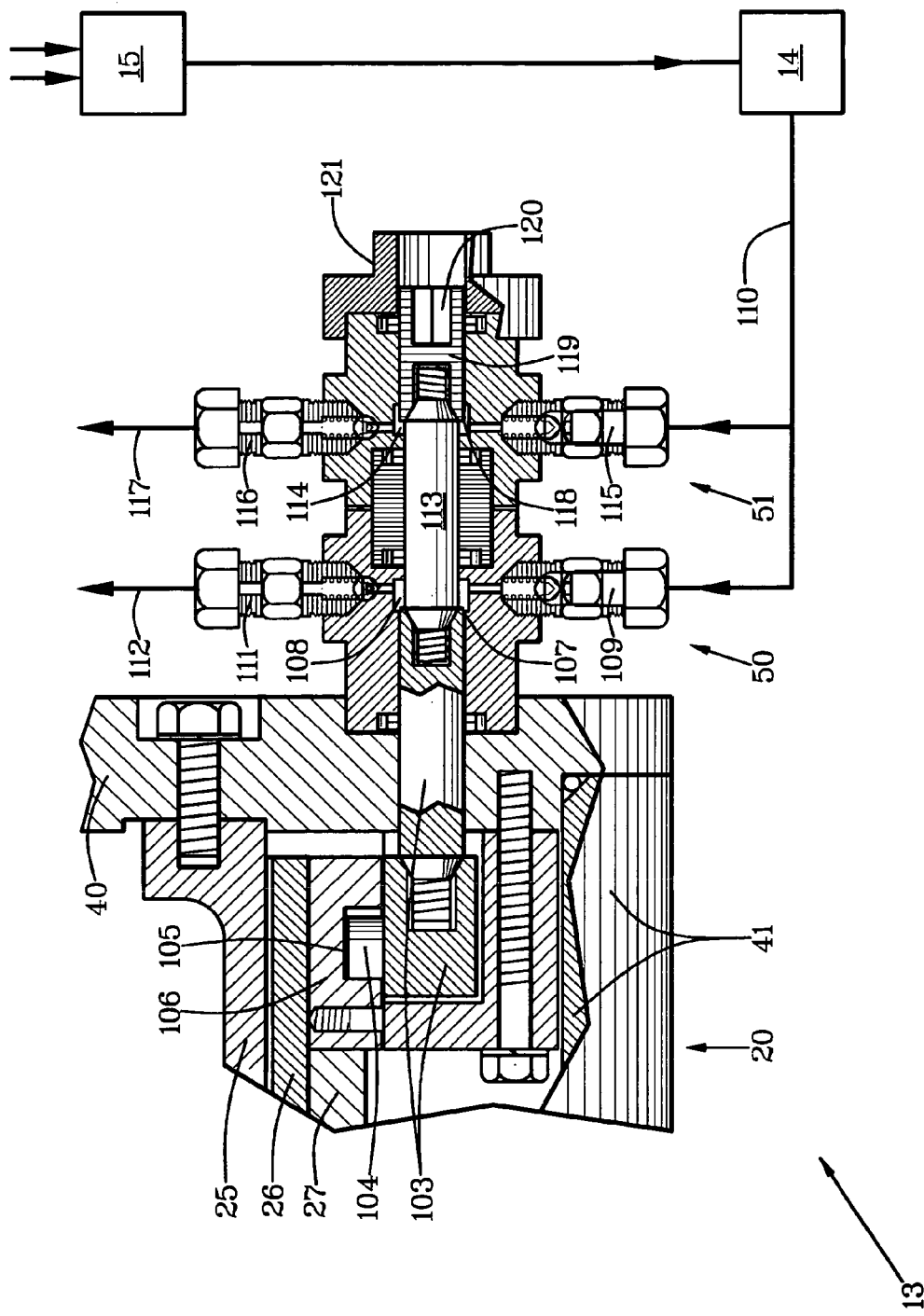
FIG. 20 is an enlarged partially cutaway side view of a preferred atomization pump for a single set of two atomizers for a water engine.

Referring to FIG. 20, a preferred atomizer pump (13) has a plunger rod (103) extended from a pump cam follower (104) in a pump cam channel (105) of a pump cam (106) attached directly or indirectly to the end-cam sleeve (27). The first activator pump (50) has a first pump plunger (107) extended from the plunger rod (103) predeterminedly into a first pump chamber (108). The plunger rod (103) is in sliding-seal contact with a cylindrical inside periphery of the first activator pump (50). A first valved inlet (109) is positioned in one-way inlet-valved communication from a water-source conveyance (110) to the first pump chamber (108). A first valved outlet (111) is positioned in one-way outlet-valved communication from the first pump chamber (108) to a first atomizer conveyance (112). A first plunger extension rod (113) is extended from the plunger rod (103) into a second pump chamber (114) in the second activator pump (51). A second valved inlet (115) is positioned in one-way inlet-valved communication from the water-source conveyance (110) to the second pump chamber (114). A second valved outlet (116) is positioned in one-way outlet-valved communication from the second pump chamber (114) to a second atomizer conveyance (117). A second pump plunger (118) is extended from the first plunger extension rod (113) into a wrench cylinder (119). The second pump plunger (118) is in sliding-seal contact with a cylindrical inside periphery of the second activator pump (51) intermediate the second activator pump (51) and the wrench cylinder (119). A wrench fitting (120) is positioned on the wrench cylinder (119). A fastener shoulder (121) is positioned on the second activator pump (51).

Figure 21:
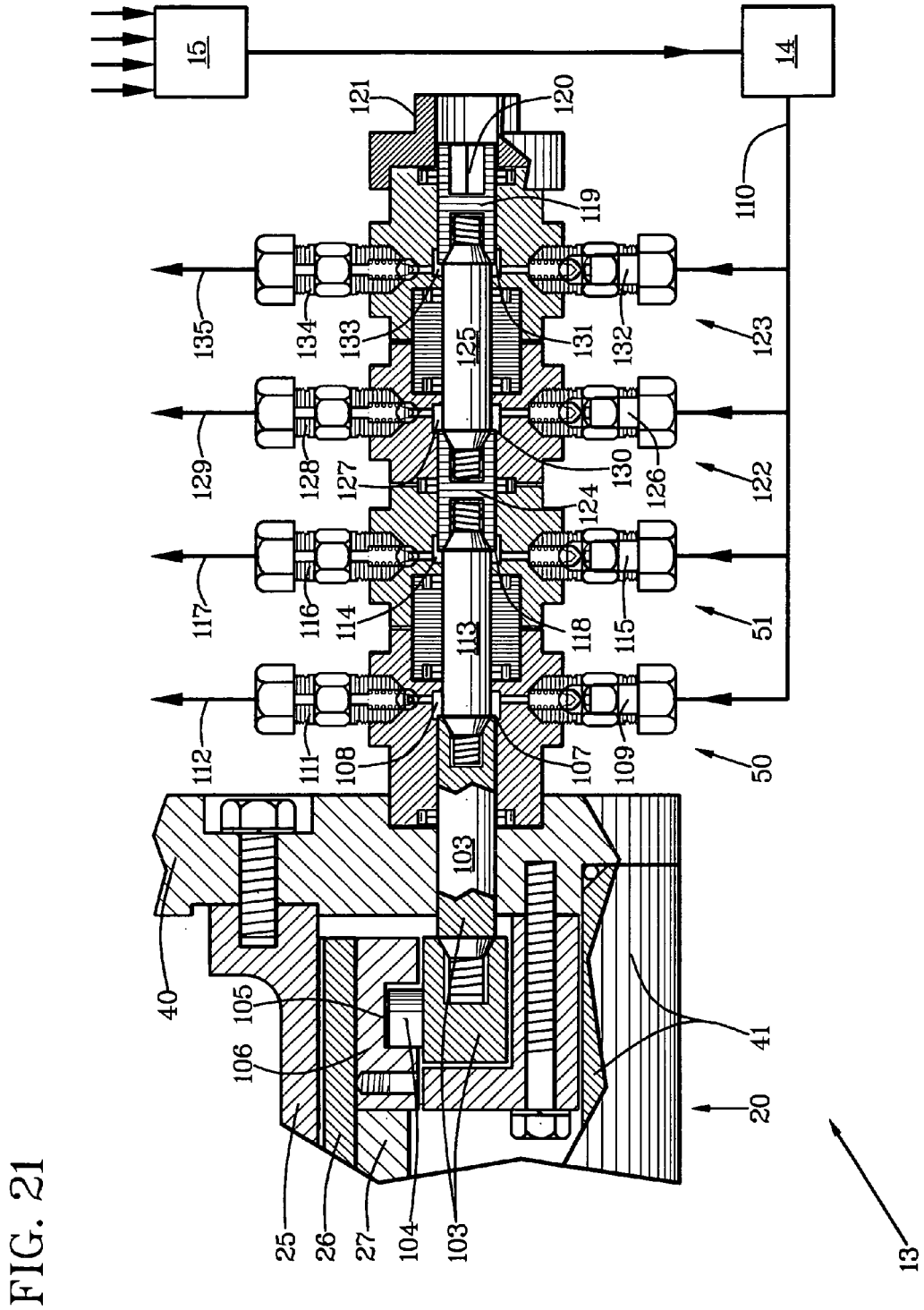
FIG. 21 is an enlarged partially cutaway side view of a preferred atomization pump for two sets of two atomizers for a water engine and for an optional water engine with combustion augmentation.

Referring to FIGS. 20-21, a third activator pump (122) and a fourth activator pump (123) can be positioned collinearly intermediate the second activator pump (51) and the fastener shoulder (121). A cylindrical second plunger rod (124) is extended collinearly from the first plunger extension rod (113) to a second plunger extension rod (125). The second pump plunger (118) is positioned on a drive end of the second plunger rod (124). A third valved inlet (126) is positioned in one-way inlet-valved communication from the water-source conveyance (110) to a third pump chamber (127). A third valved outlet (128) is positioned in one-way outlet-valved communication from the third pump chamber (127) to a third atomizer conveyance (129). A third pump plunger (130) is positioned on a shoulder end of the second plunger rod (124). The wrench cylinder (119) is extended collinearly from the second plunger extension rod (125). A fourth pump plunger (131) is positioned on a drive end of the wrench cylinder (119). A fourth valved inlet (132) is positioned in one-way inlet-valved communication from the water-source conveyance (110) to a fourth pump chamber (133). A fourth valved outlet (134) is positioned in one-way outlet-valved communication from the fourth pump chamber (133) to a fourth atomizer conveyance (135).

Referring to FIG. 9, a centerline travel (163) of the pump cam follower (104) in the pump cam channel (105) for actuating the plunger rod (103) as shown in FIGS. 2-4, 15 and 20-21 is circumferential without plunger actuation as represented by relatively long straight lines intermediate oppositely slanted short lines representing linearly actuated plunger travel. Preferred plunger travel distance is shown by distance between arrow points. Linear travel of the plunger rod (103) is preferably less than ten percent of diameters of plungers (107), (118), (130) and (131).

A plurality of atomizer pumps (13) can be positioned circumferentially on the base plate (40) in working relationship to a corresponding plurality of pump cams (106) on the end-cam sleeve (27) for providing separate injection timing for separate hydrogen activators (1).

Figure 5:
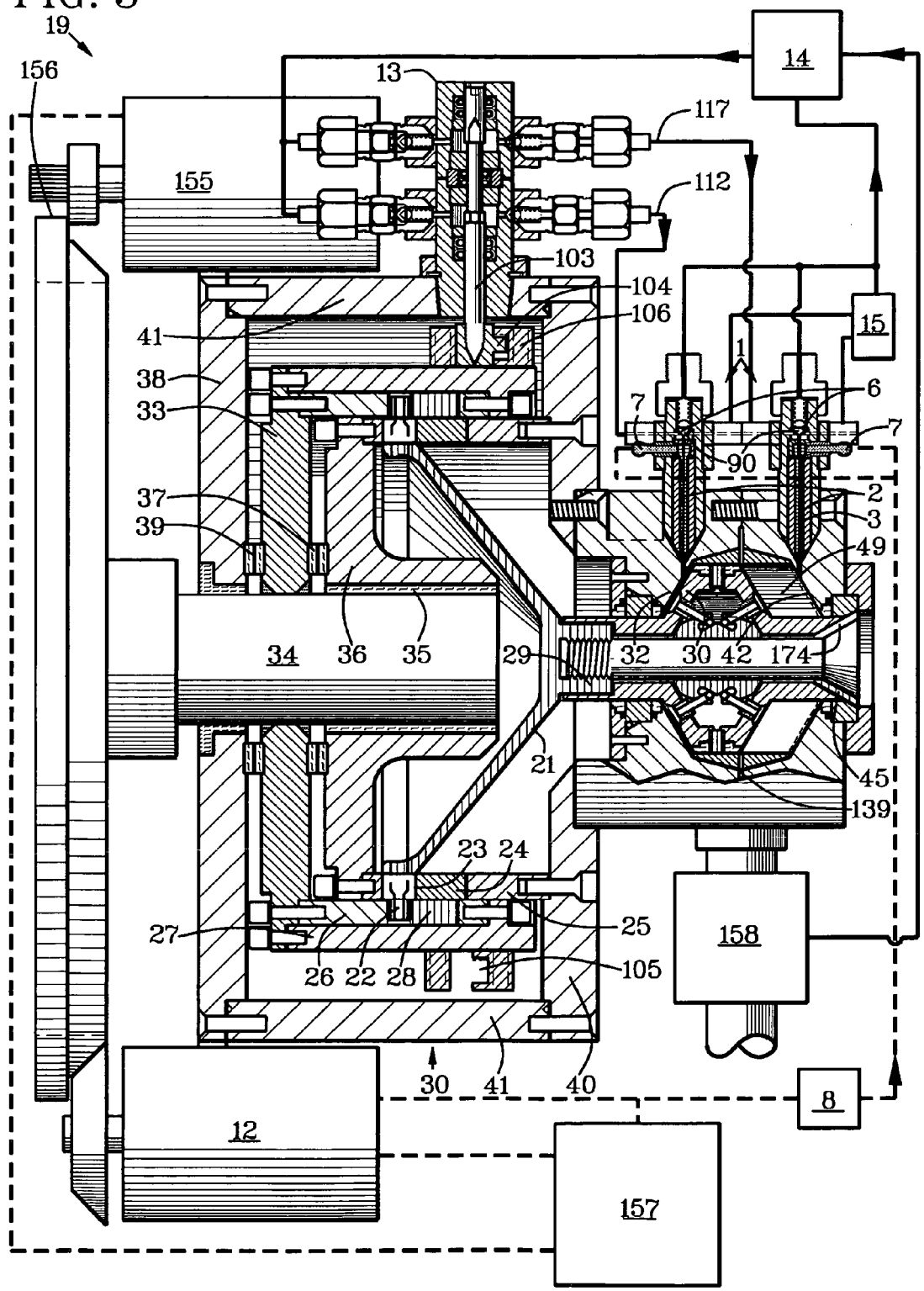
FIG. 5 is a partially cutaway side view of a rotational water engine having orificial atomizers, radially extended atomization pumps and a recirculation condenser.

Referring to FIG. 5, the rotational engine (19) can have a recirculation condenser (158) for condensing and recirculating water through the water source (14). A starter motor (155) powered by a battery (157) can be employed to rotate a takeoff gear (156) for starting the water engine.

Referring to FIGS. 5 and 7, the plunger rod (103) of the atomizer pump (13) can be extended radially from the end-cam sleeve (27) and the drive housing sleeve (41). Correspondingly, the pump cam channel (105) in the pump cam (106) can be oriented horizontally to actuate the pump cam follower (104) orthogonally for orthogonal travel of the plunger rod (103) and attached moving pump components.

Figure 4:
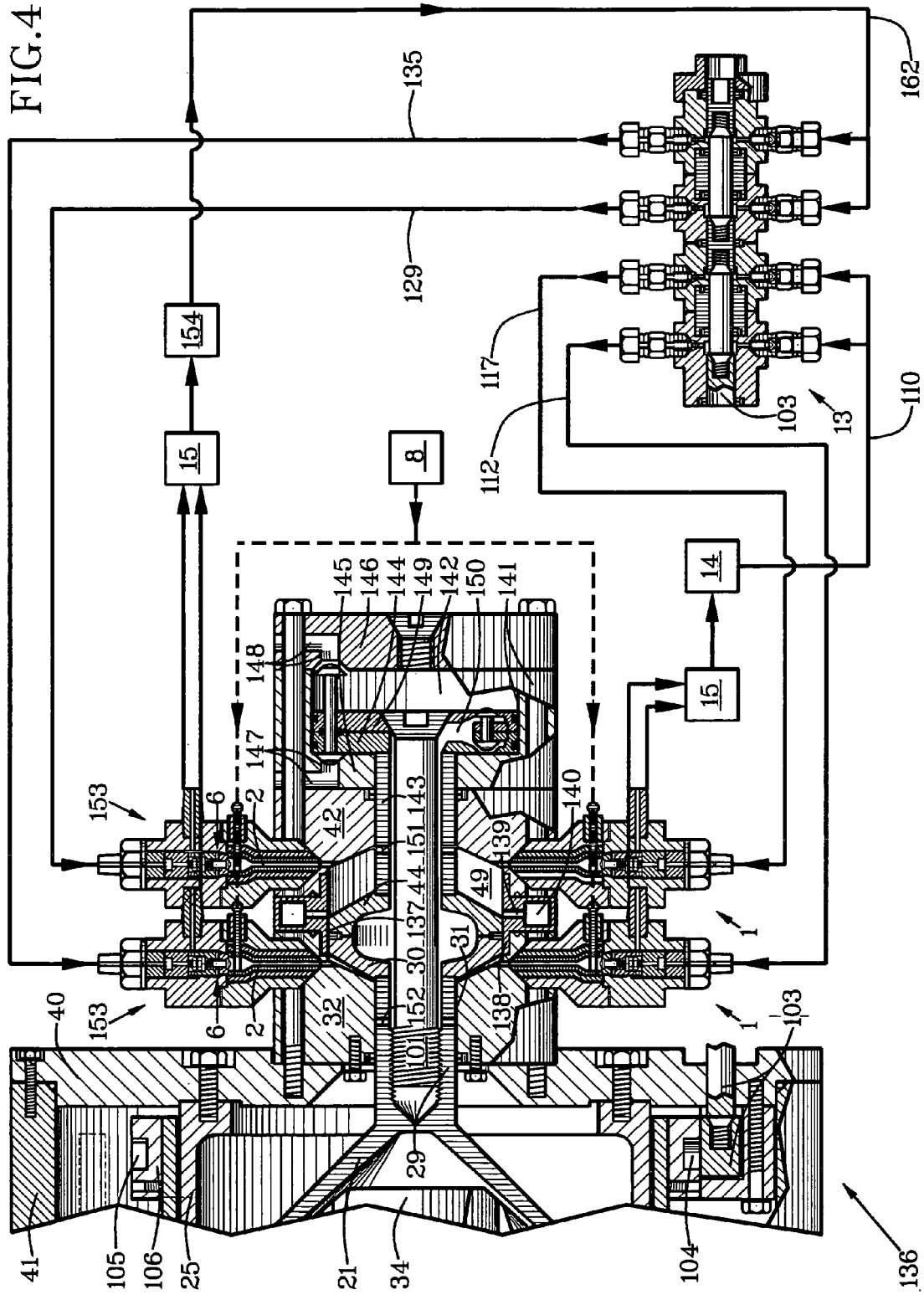
FIG. 4 is a partially cutaway side view of a piston section of the rotational water engine having combustion-heat augmentation and an atomization pump with water and fuel sections for hydrogen activators and for fuel activators.

As shown in FIG. 4 with reference also to FIGS. 2-3, 7-8 and 21 for combustion-heat augmentation, the rotational engine (19) can include a combustion-augmentation engine (136) with the turbocam drive (20) having the follower gear (21) with the follower bases (23) of the plurality of follower teeth (22) in sliding contact with the transverse slots (24) in the transverse guide (25) circumferentially intermediate the follower gear (21) and the double-end-cam (26) at an inside periphery of the end-cam sleeve (27).

The drive-piston sleeve (29) is intermediate the follower gear (21) and the drive head (30) of the double-action piston with the drive-piston sleeve (29) in sliding-seal contact with the inside periphery of the drive-head sleeve (31) of the drive-end head (32) of the double-headed power cylinder (49).

The end-cam sleeve (27) has the drive end attached to the drive-shaft plate (33) extended inwardly to the drive shaft (34) in rotational contact with the inside periphery of the drive-shaft bearing (35) in the shaft-housing plate (36).

The front thrust bearing (37) is positioned predeterminedly intermediate the drive-shaft plate (33) and the drive-housing plate (38).

The rear thrust bearing (39) is positioned predeterminedly intermediate the drive-shaft plate (33) and the shaft-housing plate (36).

The base plate (40) is attached to the drive-end head (32) and extended outward radially to the drive-housing sleeve (41) with the drive end of the drive-housing sleeve (41) being attached to the drive-housing plate (38) and the piston end of the drive-housing sleeve (41) attached to the base plate (40).

The double-action piston has a piston sleeve (137) intermediate the drive head (30) and the exhaust head (44). The piston sleeve (137) is in sliding-seal contact with the inside periphery of a cylinder sleeve (138).

A plurality of exhaust ports (139) are positioned circumferentially in the cylinder sleeve (138) predeterminedly intermediate the drive-end head (32) and the exhaust head (44) for allowing exhaust gases to escape from the double-headed power cylinder (49) with the piston sleeve (137) reciprocating to alternately opposite ends of the double-headed power cylinder (49) for uncovering the exhaust ports (139) at ends of strokes of the double-action piston.

An exhaust manifold (140) is positioned circumferentially external from and in fluid communication with the exhaust ports (139) for exhausting combustion, activated hydrogen, superheated steam and related gases through an exhaust outlet that is not shown.

A compressor sleeve (141) of a double-headed compressor cylinder (142) concentric to the cylinder sleeve (138) and the double-headed power cylinder (49) is positioned on a compression side of the double-headed power cylinder (49).

An inlet sleeve (143) is positioned linearly intermediate a power-end head (144) of a double-headed compressor piston and the exhaust head (44) of the double-action piston.

A first compressor-cylinder head (145) and a second compressor-cylinder head (146) are one-way-inlet valved through at least one first inlet port (147) and at least one second inlet port (148) from ambience to an inside periphery of the double-headed compressor cylinder (142).

The power-end head (144) and a compressor-end head (149) of the double-headed compressor piston are one-way-outlet valved in fluid communication from an inside periphery of the double-headed compressor piston through at least one compressor-piston conveyance (150) in fluid communication with an inside area of the inlet sleeve (143).

A plurality of compressor-end inlet ports (151) are positioned circumferentially in the inlet sleeve (143) for allowing exhaust-scavenging and charge-oxidizer fluid flow from inside of the inlet sleeve (143), through the compressor-end inlet ports (151) and out through the exhaust ports (139) with the double-action piston being proximate a drive end of reciprocation travel predeterminedly for uncovering the exhaust ports (139) at opposite ends of reciprocating travel of the double-action piston.

A plurality of drive-end inlet ports (152) are positioned circumferentially in the drive-piston sleeve (29) for allowing exhaust-scavenging and charge-oxidizer fluid flow from an inside periphery of the drive-piston sleeve (29), through the drive-end inlet ports (152) and out through the exhaust ports (139) with the double-action power piston being proximate an exhaust end of reciprocation travel predeterminedly for uncovering the exhaust ports (139) at alternately opposite ends of the reciprocating travel of the double-action piston.

At least one hydrogen activator (1) is positioned in hydrogen-activating communication from the water source (14) through the first atomizer conveyance (112) with fluid pressure from the atomizer pump (13) to a drive end of the double-headed power cylinder (49).

At least one hydrogen activator (1) is positioned in hydrogen-activating communication from the water source (14) through the second atomizer conveyance (117) with fluid pressure from the atomizer pump (13) to an exhaust end of the double-headed power cylinder (49).

At least one fuel activator (153) is positioned in fuel-activating communication from a fuel source (154) through the third atomizer conveyance (129) with fluid pressure from the atomizer pump (13) to the exhaust end of the double-headed power cylinder (49).

At least one fuel activator (153) is positioned in fuel-activating communication from the fuel source (154) through the fourth atomizer conveyance (135) with fluid pressure from the atomizer pump (13) to the drive end of the double-headed power cylinder (49).

Referring to FIGS. 1, 18-19 and 24-29, the heater element (3) can have predetermined structure which can include a finned heater element (171) as shown in FIGS. 24-25, a plug heater element (172) that can be finned as shown in FIGS. 26-27 or a porous heater element (173) as shown in FIGS. 28-29 for design heat-exchange capability.

Referring to FIGS. 1-6, 8-13 and 24-29, the hydrogen activator (1) can have predetermined length in proportion to structure for design heat-exchange capability.

Referring to FIG. 14, the projectile breech (76) is representative of a selection of automatic breech loaders of projectiles which are provided for in relationship to the water engine and method taught herein. Included can be clam, revolving, clip-gate and other breech-loading systems.

Referring to FIGS. 1, 14 and 30, an expulsion engine (176) can have the electrical source (8) and the atomizer pump (13) separate from the rotational engine (19).

Referring to FIGS. 1 and 16, a reaction engine (175) can be independent of the rotational engine (19) for the electrical source (8), the atomizer pump (13) and the water source (14).

A new and useful water engine and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A method comprising the following steps for generating non-radioactive water atomic energy by superheat-activating hydrogen electrons of water hydrogen to sufficiently high levels of superheat for providing output power of the non-radioactive water atomic energy by a predetermined water engine:
   providing at least one hydrogen activator (1) having an activator bore (2) with heater element (3) intermediate an inlet end (4) and an outlet end (5) of the activation bore (2) predeterminedly;
   placing an atomizer (6) in fluid-inlet communication with the inlet end (4) of the activation bore (2);
   placing an electrical lead (7) in electrical communication from an electrical source (8) to the heater element (3);
   directing atomized water from the atomizer (6) into fluid communication with the heater element (3) of the activation bore (2);
   generating non-radioactive water atomic energy by superheat-activating hydrogen electrons of the atomized water in the activation bore (2) to atomic-energy-generation superheat levels of the atomized water by applying electricity from the electrical source (8) to the heater element (3) for predetermined water-engine use of the activated hydrogen; and
   positioning the outlet end (5) of the activation bore (2) in fluid communication with a pressure chamber (9) of the predetermined water engine (10).

2. The method of claim 1 and further comprising:
   positioning an engine power takeoff (11) in power-takeoff communication with the water engine (10);
   positioning an electrical generator (12) in operational power transmission from the engine power takeoff (11) for generating electricity with the electrical generator (12);
   transmitting electricity from the electrical generator (12) to the electrical source (8);
   positioning an atomizer pump (13) in predetermined fluid-pumping communication from a water source (14) to the atomizer (6); and
   positioning a return-throttle (15) with controllable return flow of water from an atomizer inlet (16) for forcing engine-output-controllably throttle-restricted flow of water through the atomizer (6) selectively.

3. A water engine comprising:
   at least one hydrogen activator (1) having an activator bore (2) with heater element (3) positioned linearly intermediate an inlet end (4) and an outlet end (5) of the activator bore (2) predeterminedly;
   the heater element (3) being insulated electrically and at least in part insulated thermally from an activator casing (17) by insulation (18) encompassing the heater element (3) circumferentially intermediate the heater element (3) and the activator housing (17);
   an atomizer (6) being in fluid-atomizing communication from an atomizer inlet (16) to the inlet end (4) of the activator bore (2) predeterminedly;
   an electrical lead (7) being in electrical communication from an electrical source (8) to the heater element (3);
   the outlet end (5) of the activation bore (2) of the at least one hydrogen activator (1) being in fluid communication with at least one pressure chamber (9) of a selected water engine (10) predeterminedly;
   an engine power takeoff (11) positioned in power-takeoff communication with the water engine (10);
   an electrical generator (12) having operational power transmission from the engine power takeoff (11) for generating electricity with the electrical generator (12); and
   the electrical generator (12) being in electrical communication of current through the electrical lead (7) to the electrical source (8).

4. The water engine of claim 3 in which:
   the water engine (10) includes a rotational water engine (19).

5. The water engine of claim 4 in which:
   the rotational water engine (19) is a turbocam water engine with a two-way-pressured double-acting piston having a turbocam drive (20) with a follower gear (21) having a plurality of follower teeth (22) extended radially from follower bases (23) in sliding contact with rotationally transverse walls of transverse slots (24) in a transverse guide (25);
   the transverse guide (25) is positioned circumferentially intermediate the follower gear (21) and a double-end cam (26) on an inside periphery of an end-cam sleeve (27);
   the follower teeth (22) are in cam-drive contact with alternately opposite-side walls of a counter-inclined channel (28) of the double-end cam (26);
   a drive-piston sleeve (29) is positioned intermediate the follower gear (21) and a drive head (30) of a double-acting piston with a drive-piston sleeve (29) being in sliding contact with an inside periphery of a drive-head sleeve (31) of a drive-end head (32) of a double-headed power cylinder (49);
   the end-cam sleeve (27) has a drive end attached to a drive-shaft plate (33) extended inwardly to a drive shaft (34) in rotational contact with an inside periphery of a drive-shaft housing (35) in a shaft-housing plate (36);
   a front thrust bearing (37) is positioned intermediate the drive-shaft plate (33) and a drive-housing plate (38);

a rear thrust bearing (39) is positioned intermediate the drive-shaft plate (33) and the shaft-housing plate (36);

a base plate (40) is attached predeterminedly to the drive-end head (32) and extended outward radially to a drive-housing sleeve (41) having a drive end attached to the drive-housing plate (38) and a piston end attached to the base plate (40);

the double-acting piston is in sliding-seal contact with a sleeve portion of a drive end of the drive-end head (32) and with a sleeve portion of an exhaust end of an exhaust-end head (42) of the double-headed power cylinder (49) predeterminedly;

an exhaust sleeve (43) is positioned intermediate an exhaust head (44) and a tie-bolt anchor (45) with the exhaust-end sleeve (43) being in sliding-seal contact with an inside periphery of an exhaust-head sleeve (46) of the exhaust-end head (42);

the tie-bolt anchor (45) has at least one exhaust port (174) in fluid communication intermediate an inside periphery of the exhaust-end sleeve (43) and an inside periphery of the exhaust-head sleeve (46);

the double-acting piston is hollow intermediate at least one front piston valve (47) and at least one rear piston valve (48);

a front valve aperture (160) of the front piston valve (47) is structured for being in open fluid communication intermediate an inside periphery of the drive end of the double-acting piston and the drive-end head (32) of the double-headed power cylinder (49) during each forward travel of the double-acting piston towards the drive-end head (32) and for being closed during each rearward travel of the double-acting piston towards the exhaust-end head (42) for two-way-powered reciprocation of the double-acting piston in the pressure chamber (9) of the water engine (10) from pressure of water atomic energy;

a rear valve aperture (161) of the rear piston valve (48) is structured for being in open fluid communication intermediate the inside periphery of the exhaust end of the double-acting piston and the exhaust-end head (42) of the double-headed power cylinder (49) during each rearward travel of the double-acting piston towards the exhaust-end head (42) and for being closed during the each forward travel of the double-acting piston towards the drive-end head (32) for the two-way-powered reciprocation of the double-acting piston in the pressure chamber (9) of the water engine (10) from pressure of water atomic energy;

at least one hydrogen activator (1) is in fluid communication with a drive end of the double-headed power cylinder (49) for directing heat-activated gas pressure of water atomic energy from the activation bore (2) of the hydrogen activator (1) against the drive head (30) of the double-acting piston for actuating the rearward travel of the double-acting piston;

at least one hydrogen activator (1) is in fluid communication with a exhaust end of the double-headed power cylinder (49) for directing heat-activated gas pressure of water atomic energy from the activation bore (2) of the hydrogen activator (1) against the exhaust head (44) of the double-acting piston for actuating the forward travel of the double-acting piston;

an electrical lead (7) for the hydrogen activator (1) in fluid communication with the drive end of the double-headed power cylinder (49) and electrical lead (7) for the hydrogen activator (1) in fluid communication with the exhaust end of the double-headed power cylinder (49) are in electrical communication with the electrical source (8);

an atomizer (6) for the hydrogen activator (1) in fluid communication with the exhaust end of the double-headed power cylinder (49) is in fluid communication with a first valve activator pump (50) of the atomizer pump (13);

an atomizer (6) for the hydrogen activator (1) in fluid communication with the drive end of the double-headed power cylinder (49) is in fluid communication with a second activator pump (51) of the atomizer pump (13); and the atomizer inlet (16) for the hydrogen activator (1) in fluid communication with the drive end of the double-headed power cylinder (49) and the atomizer inlet (16) for the hydrogen activator (1) in fluid communication with the exhaust end of the double-headed power cylinder (49) are in return-fluid communication with the return throttle (15).

6. The water engine of claim 4 in which:

the rotational water engine (19) includes a dual water engine (52) having the drive shaft (34) of a first rotational water engine (19) coupled linearly to the drive shaft (34) of a second rotational water engine (19) for vibration damping with opposed-reciprocation travel of reciprocating parts of the double-acting piston and turbocam drive (20) of the first rotational water engine (19) and the reciprocating parts of the double-acting piston and the turbocam drive (20) of the second rotational water engine (19); and the power takeoff (11) includes a coupling gear (53) having orthogonal drive of a takeoff gear (54).

7. The water engine of claim 4 in which:

the rotational water engine (19) has a counterweight (55) for damping reciprocation vibration with counter-reciprocation travel of reciprocating parts of the double-action piston and the turbocam drive (20);

the counterweight (55) is attached to at least one counterweight cam follower (56) having a follower end in a counter-inclined counterweight cam channel (57) of a counterweight end cam (58) on an outside periphery of the end-cam sleeve (27); and a top portion of the counterweight cam follower (56) is in sliding contact with linear walls of a counterweight guide channel (169) in a transverse guide (59) attached to the drive housing sleeve (41) for arresting rotation of the counterweight (55) from rotation of the counterweight end cam (58).

8. The water engine of claim 4 in which:

the water engine includes a compound water engine.

9. The water engine of claim 8 in which:

the compound water engine includes a compound rotational water engine (60) with a first rotational water engine (19) having the generator (12) and the electrical source (8) structured and positioned for supplying electrical current to a second rotational water engine (19); and the electrical source (8) is in electrical communication with the electrical lead (7) for at least one hydrogen activator (1) of the at least one other rotational water engine (19) having the activation bore (2) in fluid communication with the drive end of the double-headed power cylinder (49) and having the electrical source (8) in electrical communication with the electrical lead (7) for the at least one hydrogen activator (1) of the at least one other rotational water engine (19) having the activation bore (2) in fluid communication with the exhaust end of the double-headed power cylinder (49).

10. The water engine of claim 8 in which:
the compound water engine includes a compound reaction water engine (61) with the rotational water engine (19) having the generator (12) and the electrical source (8) structured and positioned for supplying electrical current for thruster heat of reaction-engine heater element (62) for the compound reaction water engine (61);
the electrical source (8) is in electrical communication with the electrical lead (7) for at least one hydrogen activator (1) for the compound reaction water engine (61);
the atomizer pump (13) is in fluid communication with the atomizer (6) of the hydrogen activator (1) for the at least one compound reaction water engine (61); and
the outlet end (5) of the hydrogen activator (1) is positioned for fluid communication from the activation bore (2) to the heater element (62) upstream fluidly from a reaction thruster for the compound reaction engine (61).

11. The water engine of claim 10 in which:
the reaction thruster has a skirt nozzle (170); and
the reaction-engine heater element (62) is structured and positioned intermediate the at least one hydrogen activator (1) and a skirt-nozzle pressure chamber (63) upstream fluidly from a skirt-nozzle venture (64) in fluid communication with a nozzle skirt (65) in a skirt-nozzle engine housing (66).

12. The water engine of claim 11 and further comprising:
a bypass fan (67) attached axially to the drive shaft (34) for providing mass of airflow in a path of gas downstream fluidly from the nozzle skirt (65);
a plurality of flow straighteners (68) downstream fluidly from the bypass fan (67); and
a bypass housing (69) structured and positioned for directing the mass of airflow downstream intermediate an outside periphery of the skirt-nozzle engine housing (66) and an inside periphery of the bypass housing (69).

13. The water engine of claim 10 in which:
the reaction thruster has a plug nozzle (168); and
the reaction-engine heater element (62) is structured and positioned intermediate the at least one hydrogen activator (1) and a plug-nozzle pressure chamber (164) upstream fluidly from a plug-nozzle venturi (70) in fluid communication with a straight nozzle (71) in a straight-nozzle housing (72) of the plug nozzle (168).

14. The water engine of claim 13 in which:
an electromagnetic accelerator (73) is positioned intermediate the plug-nozzle venturi (70) and an acceleration thruster (74) structured for achieving deep-space speed acceleration.

15. The water engine of claim 13 in which:
a porous electromagnetic accelerator (167) is positioned intermediate the reaction-engine heater element (62) and the plug-nozzle pressure chamber (164) of the plug nozzle (168) for achieving deep-space speed faster than light.

16. The water engine of claim 8 in which:
the compound water engine includes a compound expulsion engine (75) having the electrical source (8) in electrical communication with the electrical lead (7) for at least one hydrogen activator (1);
the atomizer pump (13) is in fluid communication with the atomizer (6) of the at least one hydrogen activator (1) of the at least one compound expulsion engine (75); and
a projectile breech (76) is structured and positioned intermediate the activation bore (2) and a projectile bore (77) for positioning projectiles (78) for expulsion through the projectile bore (77) predeterminedly.

17. The water engine of claim 4 and further comprising:
the atomizer pump (13) in predetermined fluid-pumping communication from the water source (14) to the atomizer(6);
the return throttle (15) for returning return flow of water from the atomizer inlet (16) to the water source (14) by forcing an un-throttled portion of predeterminedly cyclic flow of the water through the atomizer (6);
the atomizer (6) includes a circumferential-atomization valve (79) having a cylindrical valve head (80) reciprocative within a predetermined atomization-clearance area internally from a cylindrical valve-seat (81) for discharging circumferentially atomized water downstream fluidly from the cylindrical valve head (80) into the activation bore (2);
a circumferential valve seat (82) upstream fluidly from the cylindrical valve head (80) and the cylindrical valve sleeve (81);
a poppet valve stem (83) is projected orthogonally from an upstream face of the cylindrical valve head (80) to a spring retainer (84) on the poppet valve stem (83) proximate the atomizer inlet (16);
an expansion-pressure spring (85) having expansion pressure in communication intermediate the spring retainer (84) and a spring base (86) upstream fluidly from the circumferential valve seat (82);
a return conveyance (87) intermediate the atomizer inlet (16) and the return throttle (15); and
a bore face (88) of the cylindrical valve head (80) in fluid communication with the activation bore (2) for directing valve-closing pressure of activated hydrogen from the activation bore (2) for directing valve-closing pressure of activated hydrogen from the activation bore (2) against the bore face (88) for closure of the circumferential-atomization valve (79) by pressured engagement of the cylindrical valve head (80) with the circumferential valve seat (82) after forcing water through the circumferential-atomization valve (79) by throffling flow through the return throttle (15).

18. The water engine of claim 4 and further comprising:
the atomizer pump (13) in predetermined fluid-pumping communication from the water source (14) to the atomizer (6);
the return throttle (15) for controlling return flow of water to the water source (14) by forcing an un-throttled portion of cyclic flow of the water through the atomizer (6);
the atomizer (6) includes an orificial-atomization valve (89) having a tapered valve head (90) with a tapered tip movable against a tapered valve seat (91) with a tapered inside periphery structured for receiving a tapered surface of the tapered valve head (90);
the tapered valve head (91) having a valve orifice (92) at a minor-diameter bottom with an inside periphery sized for atomizing pressured water with the tapered tip of the tapered valve head (90) removed from the valve orifice (92) predeterminedly;
an inlet conveyance (93) is in fluid communication from the atomization pump (13) to the tapered valve seat (91);
an orificial return conveyance (94) is in fluid communication from the tapered valve seat (91) to the return throttle (15);
a closure spring (95) is positioned with predetermined expansion pressure intermediate a major-diameter face of the tapered valve head (90) and a return wall (96) of a pressure-bleed cylinder (97);

a pressure-bleed conveyance (98) is in fluid communication intermediate the pressure-bleed cylinder (97) and the water source (14);

the return throttle (15) is structured for forcing water through the orificial atomization valve (89) and past the tapered valve head (90); and the inlet conveyance (93) and the orificial return conveyance (94) are structured and positioned for fluid flow through the tapered valve seat (91), through the valve orifice (92) and minimally past the tapered valve head (90) by throttling pressure of fluid from the atomizer pump (13) selectively.

19. The water engine of claim 5 in which:

the drive-end head (32) is locatable laterally and positional axially against the base plate (40) for positioning the drive-end sleeve (31) concentrically to the drive-piston sleeve (29);

a cylinder-seal sleeve (99) is locatable laterally and positional axially intermediate the drive-end head (32) and the exhaust-end head (45) of the double-headed power cylinder (49) for positioning the cylinder-seal sleeve (99) concentrically to the drive-end sleeve (31) and concentrically to the double-action piston with the follower gear (21) being supported concentrically to the transverse guide (25) with the follower bases (23) in sliding contact with walls of the transverse slots (24);

a high-pressure piston ring (100) is locatable laterally and positional axially intermediate the drive head (30) and the exhaust head (44) of the double-action piston;

the high-pressure ring (100) is a solid, non-gap ring having predeterminedly wide width and predeterminedly close-fit seal against an inside periphery of the of the cylinder-seal sleeve (99);

a tie bolt (101) is extended intermediate the exhaust end of the exhaust-head sleeve (43) and the drive-piston sleeve (29);

a drive end of the tie bolt (101) is threaded into an inside periphery of the drive-piston sleeve (29); and a plurality of head bolts (102) are threaded into the base plate (40) from an exhaust end of the exhaust head (45).

20. The water engine of claim 5 in which:

the atomizer pump (13) has a plunger rod (103) extended from a pump cam follower (104) in a pump cam channel (105) of a pump cam (106) attached to the end-cam sleeve (27);

the first activator pump (50) has a first pump plunger (107) extended from the plunger rod (103) predeterminedly into a first pump chamber (108);

the plunger rod (103) is in sliding-seal contact with a cylindrical inside periphery of the first activator pump (50);

a first valved inlet (109) is positioned in one-way inlet-valved communication from a water-source conveyance (110) to the first pump chamber (108);

a first valved outlet (111) is positioned in one-way outlet-valved communication from the first pump chamber (108) to a first atomizer conveyance (112);

a first plunger extension rod (113) is extended from the plunger rod (103) into a second pump chamber (114) in the second activator pump (51);

a second valved inlet (115) is positioned in one-way inlet-valved communication from the water-source conveyance (110) to the second pump chamber (114);

a second valved outlet (116) is positioned in one-way outlet-valved communication from the second pump chamber (114) to a second atomizer conveyance (117);

a second pump plunger (118) is extended from the first plunger extension rod (113) into a wrench cylinder (119);

the second pump plunger (118) is in sliding-seal contact with a cylindrical inside periphery of the second activator pump (51) intermediate the second activator pump (51) and the wrench cylinder (119);

a wrench fitting (120) is positioned on the wrench cylinder (119); and a fastener shoulder (121) is positioned on the second activator pump (51).

21. The water engine of claim 5 and further comprising:

a third activator pump (122) and a fourth activator pump (123) positioned collinearly intermediate the second activator pump (51) and the fastener shoulder (121);

a cylindrical second plunger rod (124) is extended collinearly from the first plunger extension rod (113) to a second plunger extension rod (125);

a second pump plunger (118) is positioned on a drive end of the second plunger rod (124);

a third valved inlet (126) is positioned in one-way inlet-valved communication from the water-source conveyance (110) to a third pump plunger (127);

a third valved outlet (128) is positioned in one-way outlet-valved communication from the third pump plunger (127) to a third atomizer conveyance (129);

a third pump plunger (130) is positioned on a shoulder end of the second plunger rod (124);

the wrench cylinder (119) is extended collinearly from the second plunger extension rod (125);

a fourth pump plunger (131) is positioned on a drive end of the wrench cylinder (119);

a fourth valved inlet (132) is positioned in one-way inlet-valved communication from the water-source conveyance (110) to a fourth pump chamber (133); and a fourth valved outlet (134) is positioned in one-way outlet-valved communication from the fourth pump cylinder (133) to a fourth atomizer conveyance (135).

\* \* \* \* \*